(12) United States Patent
Howard

(10) Patent No.: US 8,356,371 B2
(45) Date of Patent: Jan. 22, 2013

(54) MATTRESS SYSTEM AND METHOD

(76) Inventor: John Hunter Howard, Frisco, TX (US)

( * ) Notice: Subject to any disclaimer, the term of this patent is extended or adjusted under 35 U.S.C. 154(b) by 0 days.

(21) Appl. No.: 13/370,409

(22) Filed: Feb. 10, 2012

(65) Prior Publication Data

US 2012/0137443 A1 Jun. 7, 2012

Related U.S. Application Data

(63) Continuation of application No. 12/037,220, filed on Feb. 26, 2008, now Pat. No. 8,117,700.

(60) Provisional application No. 60/903,450, filed on Feb. 26, 2007.

(51) Int. Cl.
*A47C 27/05* (2006.01)

(52) U.S. Cl. .......................... 5/690; 5/720; 5/727; 5/740

(58) Field of Classification Search .............. 5/690, 720, 5/727, 738, 740, 655.8, 657
See application file for complete search history.

(56) References Cited

U.S. PATENT DOCUMENTS

| | | | |
|---|---|---|---|
| 1,528,066 A * | 3/1925 | McEntire | 5/722 |
| 1,914,661 A * | 6/1933 | Burke | 5/722 |
| 3,950,800 A | 4/1976 | Garshfield | |
| 4,449,261 A * | 5/1984 | Magnusson | 5/722 |
| 5,101,527 A | 4/1992 | Wadsworth, III et al. | |
| 5,231,717 A | 8/1993 | Scott et al. | |
| 5,435,026 A | 7/1995 | Cavazos | |
| 5,471,688 A | 12/1995 | Cavazos | |
| 5,485,639 A | 1/1996 | Cavazos | |
| 5,533,459 A | 7/1996 | Fontana | |
| 5,644,811 A | 7/1997 | Cavazos | |
| 5,745,940 A | 5/1998 | Roberts et al. | |
| 5,802,646 A | 9/1998 | Stolpmann et al. | |
| 5,815,865 A | 10/1998 | Washburn et al. | |
| 5,970,547 A * | 10/1999 | Cavazos | 5/690 |
| 5,987,678 A | 11/1999 | Ayers | |
| 6,055,689 A * | 5/2000 | Cavazos | 5/690 |
| 6,088,859 A | 7/2000 | Cavazos | |
| 6,101,653 A | 8/2000 | England | |
| 6,115,861 A | 9/2000 | Reeder et al. | |
| 6,175,997 B1 | 1/2001 | Mossbeck | |
| 6,202,239 B1 | 3/2001 | Ward et al. | |
| 6,233,760 B1 | 5/2001 | Cavazos | |
| 6,260,223 B1 | 7/2001 | Mossbeck et al. | |
| 6,338,174 B1 | 1/2002 | Stjerna | |
| 6,371,458 B1 | 4/2002 | Stjerna | |
| 6,397,419 B1 | 6/2002 | Mechache | |
| 6,398,199 B1 | 6/2002 | Barber | |
| 6,460,209 B1 | 10/2002 | Reeder et al. | |
| 6,540,214 B2 | 4/2003 | Barber | |
| 6,571,192 B1 | 5/2003 | Hinshaw et al. | |
| 6,574,811 B1 | 6/2003 | Mossbeck | |
| 6,585,328 B1 | 7/2003 | Oexman et al. | |

(Continued)

FOREIGN PATENT DOCUMENTS

WO    WO 99/18827    4/1999

OTHER PUBLICATIONS

U.S. Appl. No. 60/903,450, filed Feb. 26, 2007, Howard.
International Search Report, International Application No. PCT/US2008/05508, Feb. 26, 2008, 4 pages.
Written Opinion of the International Searching Authority, International Application No. PCT/US2008/05508, Feb. 26, 2008, 8 pages.

(Continued)

*Primary Examiner* — Fredrick Conley
(74) *Attorney, Agent, or Firm* — Haynes and Boone, LLP

(57) ABSTRACT

A mattress system and method according to which a custom mattress is built according to customer-specific parameters. In several exemplary embodiments, the custom mattress includes one or more removable core cartridges and/or one or more removable topper cartridges.

5 Claims, 11 Drawing Sheets

U.S. PATENT DOCUMENTS

| | | |
|---|---|---|
| 6,741,950 B2 | 5/2004 | Hinshaw et al. |
| 6,952,850 B2 | 10/2005 | Visser et al. |
| 6,952,852 B2 | 10/2005 | Reeder et al. |
| 6,990,425 B2 | 1/2006 | Hinshaw et al. |
| 7,044,454 B2 | 5/2006 | Colman et al. |
| 7,048,263 B2 | 5/2006 | Ahlqvist |
| 7,063,309 B2 | 6/2006 | Colman |
| 7,757,322 B2 * | 7/2010 | An .................................. 5/722 |
| 7,861,342 B1 * | 1/2011 | Huang .............................. 5/716 |
| 2007/0022540 A1 | 2/2007 | Hochschild |

OTHER PUBLICATIONS

Office Action mailed Oct. 25, 2010, by the USPTO, in connection with U.S. Appl. No. 12/037,220.

Office Action mailed Mar. 15, 2011, by the USPTO, in connection with U.S. Appl. No. 12/037,220.

Notice of Allowance mailed Oct. 17, 2010, by the USPTO, in connection with U.S. Appl. No. 12/037,220.

* cited by examiner

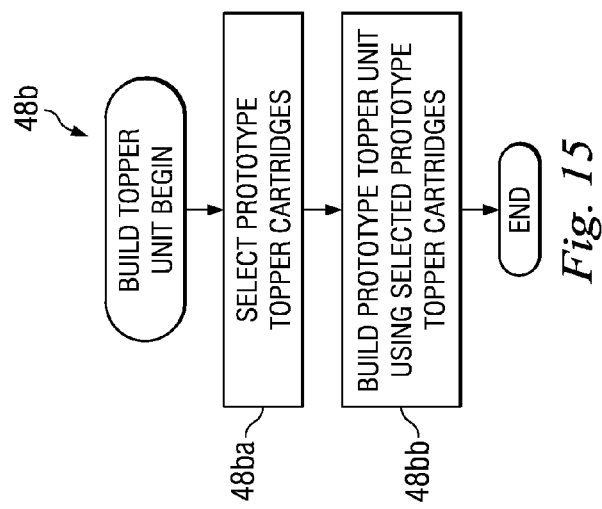
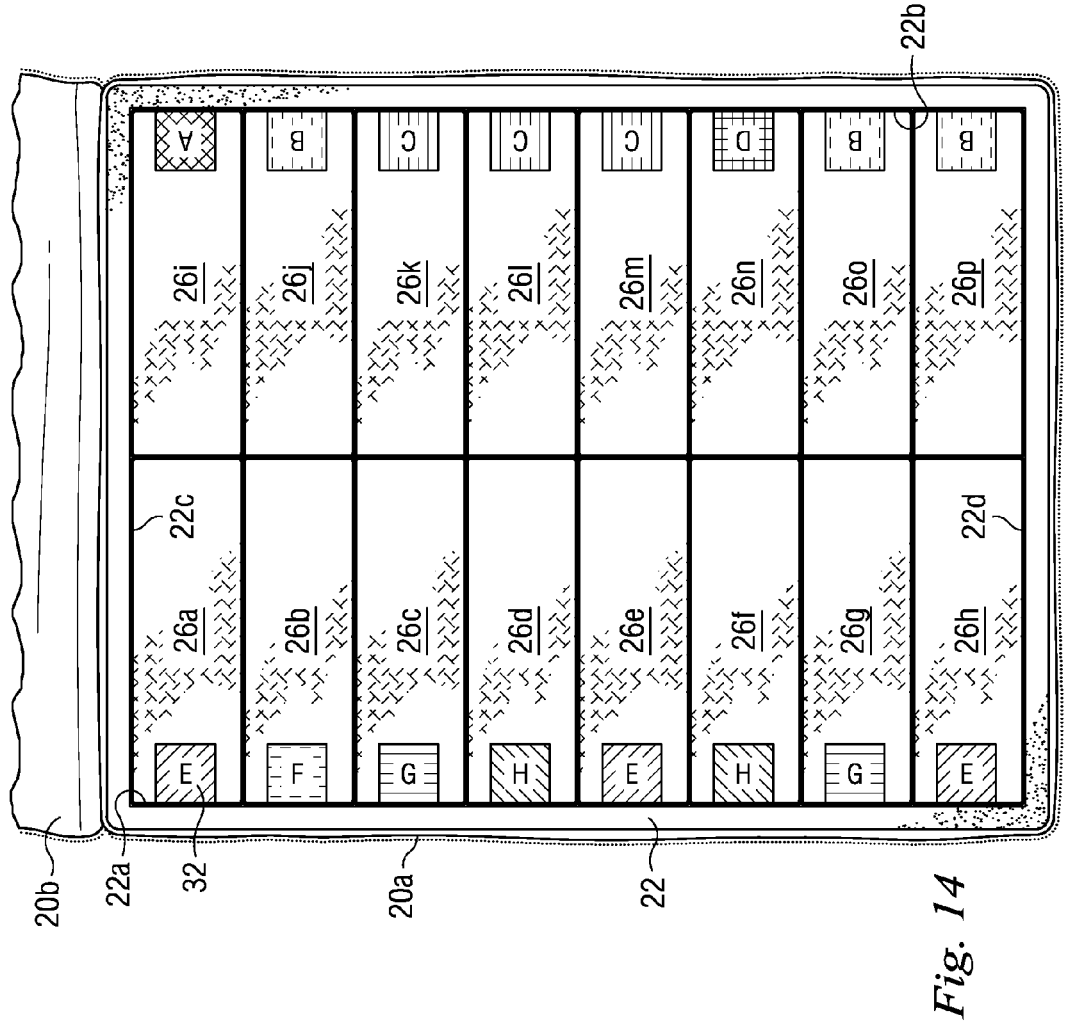

MATTRESS SYSTEM AND METHOD

CROSS REFERENCE TO RELATED APPLICATION

This application is a continuation of U.S. application Ser. No. 12/037,220, filed Feb. 26, 2008, which claims the benefit of the filing date of U.S. application Ser. No. 60/903,450, filed on Feb. 26, 2007, the entire disclosures of which are incorporated herein by reference.

BACKGROUND

The present disclosure relates in general to bedding, and in particular to a mattress system and method according to which a custom mattress is built according to customer-specific parameters.

BRIEF DESCRIPTION OF THE DRAWINGS

FIG. 14 is a perspective view of the selected prototype core cartridges and components of the prototype core unit according to respective exemplary embodiments, which are used in the step of building the prototype core unit of FIG. 11 according to an exemplary embodiment.

FIG. 15 is a flow chart illustration of the step of building the prototype topper unit of FIG. 11 according to an exemplary embodiment, the step including selecting prototype topper cartridges and building the prototype topper unit using the selected prototype topper cartridges.

DETAILED DESCRIPTION

Figure 1:
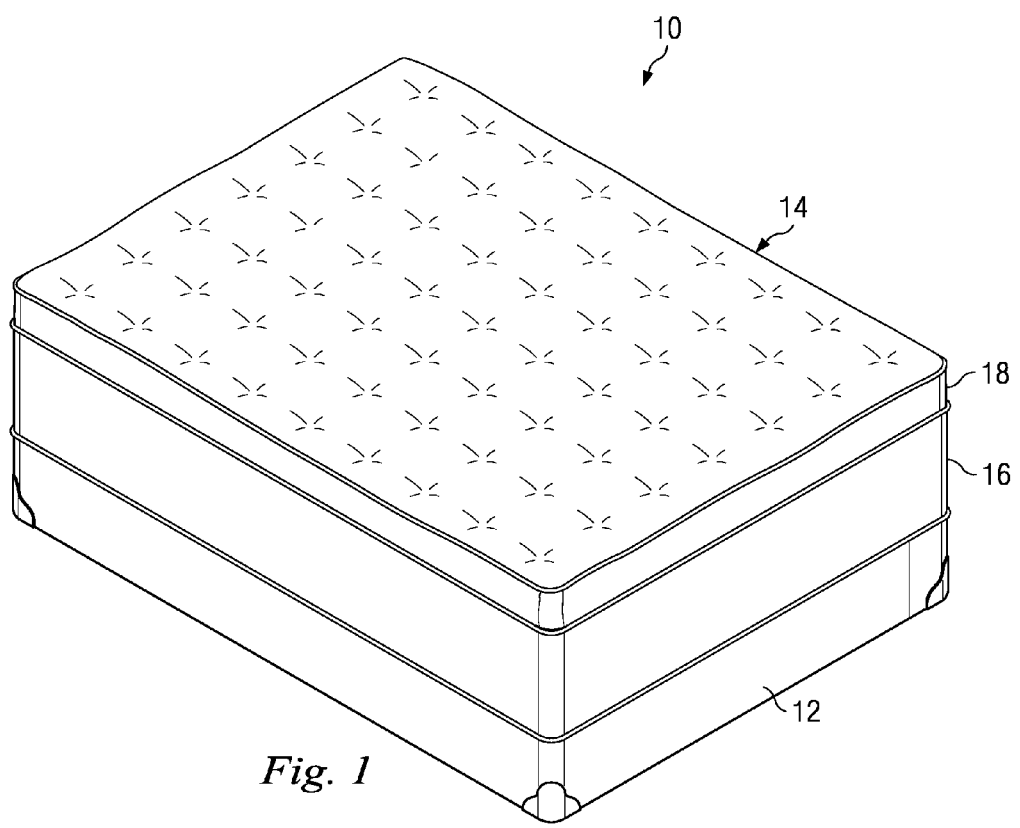
FIG. 1 is a perspective view of a bed according to an exemplary embodiment, the bed including a custom mattress according to an exemplary embodiment, the custom mattress including a core unit and a topper unit.

In an exemplary embodiment, as illustrated in FIG. 1, a bed is generally referred to by the reference numeral 10 and includes a foundation layer or box platform 12 and a custom mattress 14 resting thereon, the box platform 12 supporting the custom mattress 14. The custom mattress 14 includes a support layer or core unit 16 and a comfort layer or topper unit 18 removably coupled thereto. In several exemplary embodiments, the bed 10 is of any type and/or size of bed such as, for example, any type and/or size of queen-size bed, any type and/or size of king-size bed, or any type and/or size of double bed.

Figure 2:
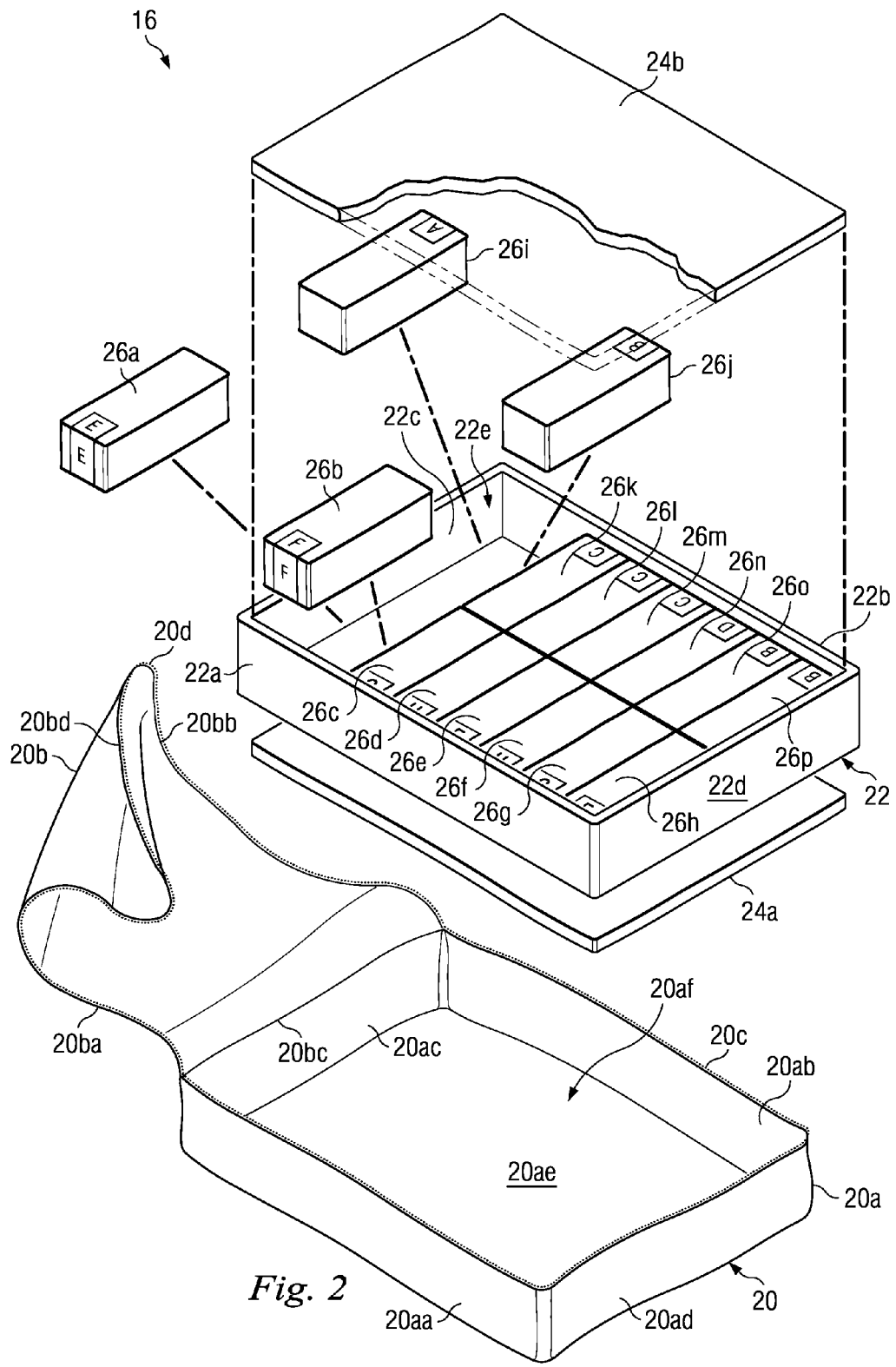
FIG. 2 is an exploded view of the core unit of the custom mattress of FIG. 1 according to an exemplary embodiment, the core unit including a plurality of removable core cartridges.

In an exemplary embodiment, as illustrated in FIG. 2 with continuing reference to FIG. 1, the core unit 16 includes a cover 20, an encasement 22, cushion panels 24a and 24b, and removable core cartridges 26a-26p.

In an exemplary embodiment, the cover 20 includes an open-top portion 20a including sides 20aa, 20ab, 20ac, 20ad and 20ae, which define an internal region 20af. A cover portion 20b is hingedly coupled at or near the top edge of the side 20ac of the open-top portion 20a, and is adapted to pivot about the top edge of the side 20ac in order to enclose the internal region 20af, for reasons to be described. The cover portion 20b defines edges 20ba, 20bb, 20bc and 20bd, with the edge 20bc being hingedly coupled at or near the top edge of the side 20ac of the open-top portion 20a. A zipper connection 20c extends along the sides 20aa, 20ad and 20ab of the open-top portion 20a, at or near the top edges thereof. A zipper connection 20d extends along the edges 20ba, 20bb and 20bd of the cover portion 20b, and is adapted to mate with and form a zipper connection with the zipper connection 20c in order to couple the cover portion 20b to the open-top portion 20a and thereby enclose the internal region 20af, for reasons to be described. In several exemplary embodiments, instead of, or in addition to the zipper connections 20c and 20d, a wide variety of fastening systems, devices and/or techniques are employed to couple the cover portion 20b to the open-top portion 20a and thereby enclose the internal region 20af, such as, for example, Velcro® fasteners, straps, folds, buttons, and/or any combination thereof. In several exemplary embodiments, the cover 20 is composed of or includes natural material, synthetic material, fabric material, and/or any combination thereof. In several exemplary embodiments, the zipper connection 20c is vertically positioned at any point along the height of the cover 20, and the cover portion 20b includes a height dimension to accommodate this variation in the vertical position of the zipper connection 20c. In an exemplary embodiment, the open-top portion 20a and the cover portion 20b are mirror images of one another, or near mirror images of one another, and thus form a clam-shell arrangement. In an exemplary embodiment, the cover 20 is flipped over so that the cover portion 20b is disposed on the bottom side of the cover 20.

In an exemplary embodiment, the encasement 22 is in the form of a four-sided box and includes sides 22a, 22b, 22c and 22d, which define an internal region 22e. In an exemplary embodiment, the encasement 22 is a foam encasement, with the sides 22a, 22b, 22c and 22d being composed of, and/or including, one or more types of foam. In an exemplary embodiment, the encasement 22 is a foam encasement composed of a relatively firm foam rubber such as a high resiliency, high density urethane foam. In an exemplary embodiment, the inside surfaces of the sides 22a, 22b, 22c and 22d defining the internal region 22e are lined with fabric such as, for example, a non-woven fabric. In an exemplary embodiment, the encasement 22 is a spring encasement, with the sides 22a, 22b, 22c and 22d being composed of, and/or including, one or more springs, which, in several exemplary embodiments, are coupled together by one or more border wires that extend along the respective lengths of the sides 22a, 22b, 22c and 22d.

In an exemplary embodiment, the cushions 24a and 24b are sized to extend within the internal region 22e of the encasement 22, under conditions to be described, and are composed of cushioning material such as, for example, one or more types of foam, and/or any combination thereof.

Figure 3:
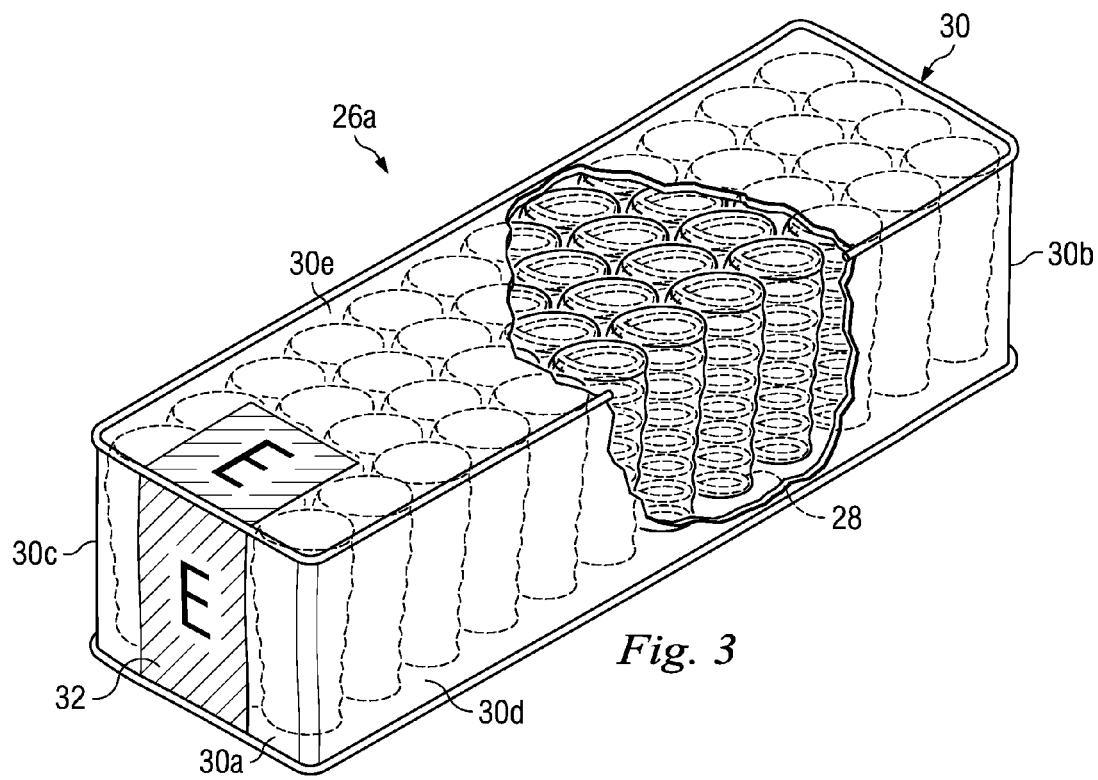
FIG. 3 is a perspective view of one of the removable core cartridges of FIG. 2 according to an exemplary embodiment.
Figure 4:
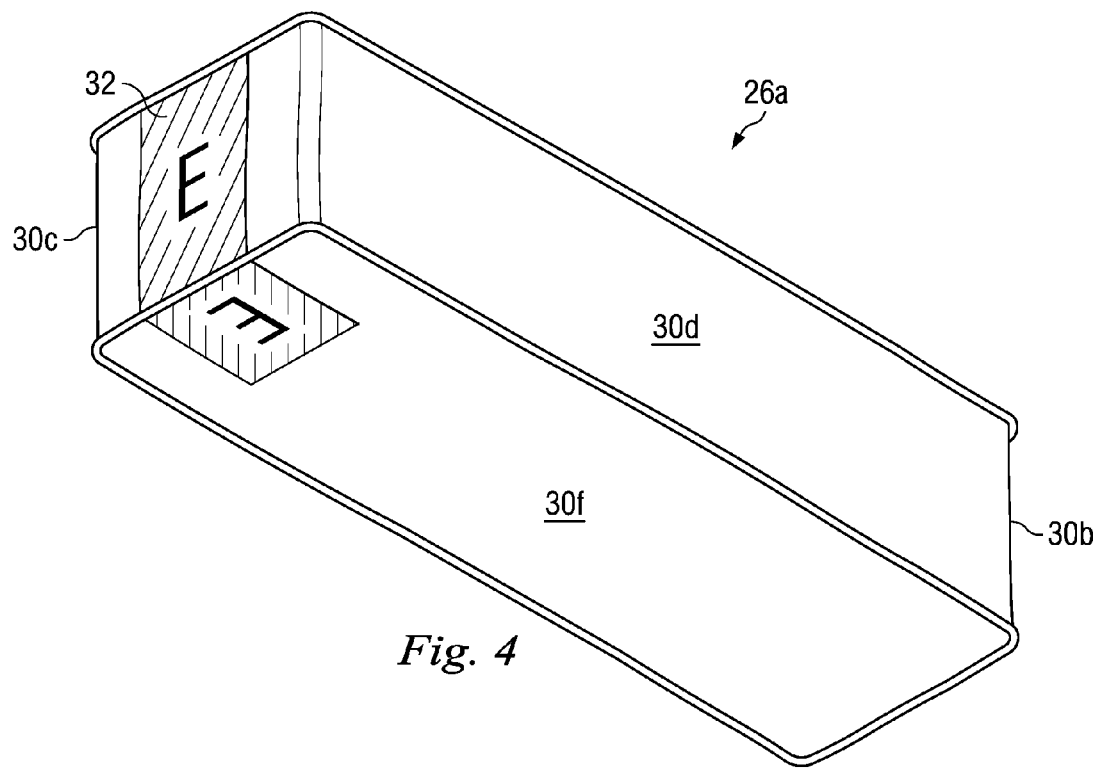
FIG. 4 is another perspective view of the removable core cartridge of FIG. 3.

In an exemplary embodiment, as illustrated in FIGS. 3 and 4 with continuing reference to FIGS. 1 and 2, the removable core cartridge 26a includes a plurality of springs 28, which are arranged in a 4 springs by 12 springs (4×12) grid. The springs 28 are wrapped in a fabric sleeve 30 including sides 30a, 30b, 30c, 30d, 30e and 30f. In an exemplary embodiment, the fabric sleeve 30 includes, or is composed of, a non-woven fiber.

In an exemplary embodiment, a label 32 is coupled to the sides 30e, 30a and 30f, thereby wrapping around the side 30a. The label 32 is color coded, that is, the color of the label corresponds to, and identifies, the specific pressure resistance and/or firmness/support characteristic of the core cartridge 26a. Moreover, the label 32 includes a symbol, such a letter, a number, and/or any combination thereof, which corresponds to, and identifies, the specific pressure resistance value and/or firmness/support characteristic of the core cartridge 26a, and the symbol is printed on the portion of the label 32 coupled to the side 30a of the sleeve 30, the portion of the label 32 coupled to the side 30e of the sleeve 30, and the portion of the label 32 coupled to the side 30f of the sleeve 30. In an exemplary embodiment, the label 32 is glued onto the sleeve 30 using a heat-activated adhesive. In an exemplary embodiment, the label 32 is a fabric label and is sewn to the sleeve 30.

In several exemplary embodiments, each of the springs 28 in the core cartridge 26a has a predetermined force and/or pressure resistance characteristic. In several exemplary embodiments, one or more of the springs 28 have a wide variety of sizes, heights, solid heights, diameters, turns, and/or any combination thereof, and/or are composed of a wide variety of materials, a wide variety of wires having a wide variety of gages, and/or any combination thereof. In several exemplary embodiments, the physical, mechanical, material and/or performance characteristics and/or specifications of the plurality of springs 28 either are uniform or vary among the different springs in the plurality of springs 28. In several exemplary embodiments, one or more of the springs 28 include a plurality of springs coupled together. In an exemplary embodiment, instead of a 4×12 grid, the plurality of springs 28 in the core cartridge 26a are arranged in a 4 springs by 16 springs (4×16) grid.

Each of the core cartridges 26b-26p is substantially identical to the core cartridge 26a and therefore will not be described in detail, except that each core cartridge may have a different specific pressure resistance value and/or firmness/support characteristic, and thus the corresponding label 32 of the core cartridge may have a different color code and a different symbol corresponding to, and identifying, the specific pressure resistance value and/or firmness/support characteristic of the core cartridge. In an exemplary embodiment, the color coding of the respective labels 32 of the core cartridges 26a-26p is such that the intensity of the color on each label 32 indicates the pressure resistance value and/or firmness/support characteristic of the core cartridge 26 to which the label 32 is coupled; for example, the greater the intensity of the color of the label 32, then the higher the pressure resistance value and/or firmness/support characteristic.

In an exemplary embodiment, the pressure resistance value and/or firmness/support characteristic of each of the core cartridges 26a-26p is selected from a plurality of possible pressure resistance values and/or firmness/support characteristics. In an exemplary embodiment, the pressure resistance value and/or firmness/support characteristic of each of the core cartridges 26a-26b is selected from eight possible types having respective pressure resistance values and/or firmness/support characteristics, and thus the color coding of the label 32 corresponds to a set of eight colors and/or color intensities, and the symbol on the label 32 corresponds to a set of eight symbols such as, for example, letters A through H.

In an exemplary embodiment, one or more pieces of material, such as pieces of foam, are enclosed within one or more of the respective sleeves 30 to shim one or more dimensions of the respective core cartridges 26a-26p so as to provide a uniform size among all of the core cartridges 26a-26p. In several exemplary embodiments, instead of, or in addition to the plurality of springs 28, one or more of the removable core cartridges 26a-26p may be composed of, or include, foam, air bladders or cushions, other pressure-resistance mechanisms, and/or any combination thereof.

In an exemplary embodiment, with continuing reference to FIGS. 1-5, when the custom mattress 14 is an assembled condition as shown in FIG. 1, the encasement 22 is removably disposed within the region 20af of the cover portion 20a of the cover 20, and the cushion panel 24a is removably disposed within the region 22e of the encasement 22 so that the lower surface of the cushion panel 24a is generally flush with the lower edges of the sides 22a, 22b, 22c and 22d of the encasement 22. The core cartridges 26a-26p are removably disposed within the region 22e of the encasement 22, and engage the upper surface of the cushion panel 24a. The core cartridges 26a-26h engage one or more of the sides 22a, 22c and 22d of the encasement 22, and the core cartridges 26i-26p engage one or more of the sides 22b, 22c and 22d of the encasement 22. In an exemplary embodiment, each of the core cartridges 26a-26p forms an interference fit with adjacent core cartridges and one or more of the sides 22a, 22b, 22c and 22d of the encasement 22, thereby generally resisting or limiting any relative movement between two or more of the core cartridges 26a-26p, and/or between the core cartridges 26a-26p and the encasement 22. In an exemplary embodiment, fastening systems, devices and/or techniques, such as, for example, Velcro® fasteners, are employed to couple adjacent pairs of the core cartridges 26a-26p together, and/or to couple the core cartridges 26a-26p to the encasement 22, thereby generally resisting or limiting any relative movement between two or more of the core cartridges 26a-26p, and/or between the core cartridges 26a-26p and the encasement 22. The cushion panel 24b is removably disposed within the region 22e of the encasement 22 so that the upper surface of the cushion panel 24b is generally flush with the upper edges of the sides 22a, 22b, 22c and 22d of the encasement 22. The cover portion 20b of the cover 20 is pivoted about the edge 20bc so that the zipper connection 20d mates with and forms a zipper connection with the zipper connection 20c, thereby enclosing the region 20af and thus the encasement 22, the cushion panel 24a, the core cartridges 26a-26p, and the cushion panel 24b.

Figure 5:
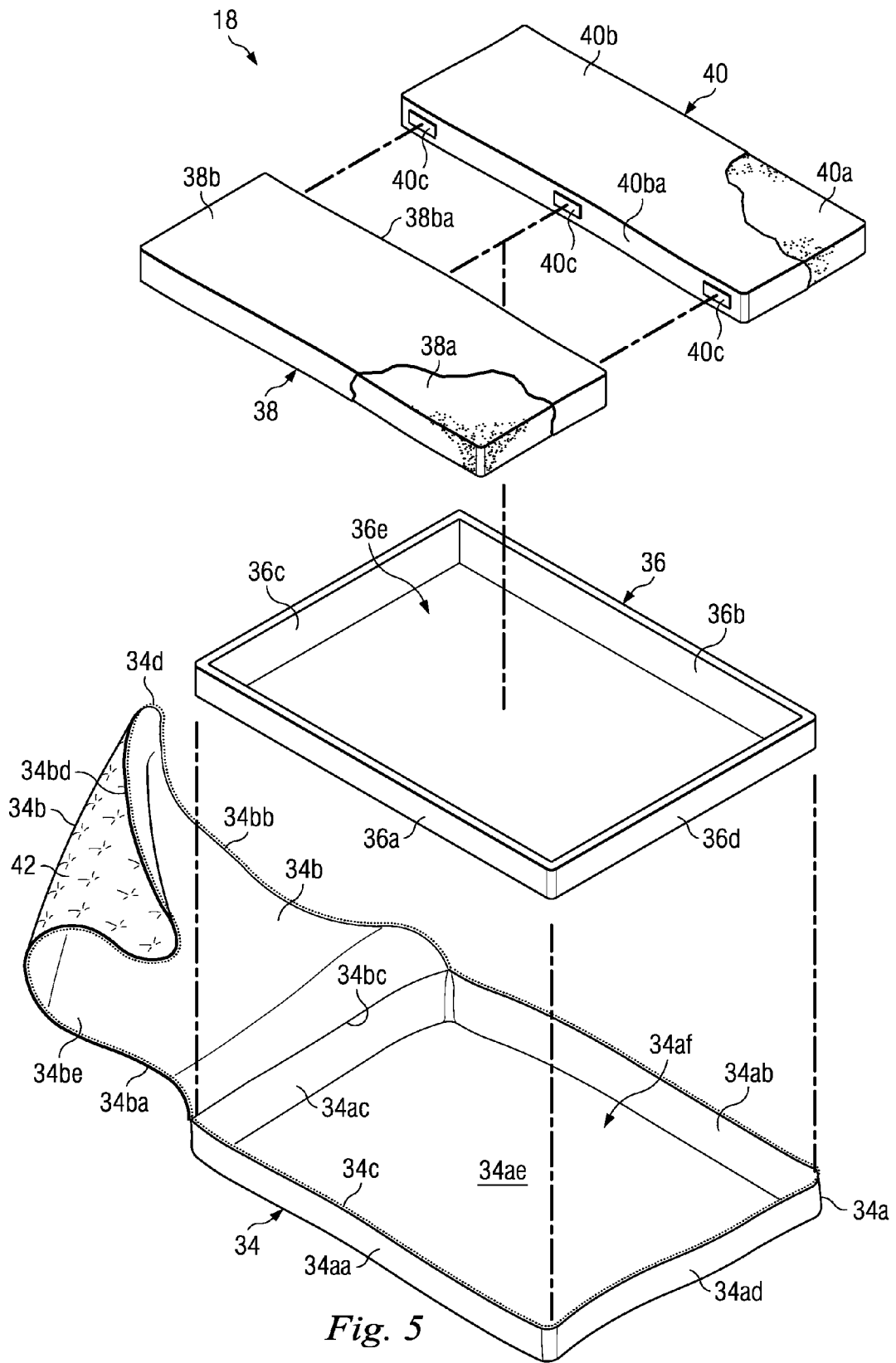
FIG. 5 is an exploded view of the topper unit of the custom mattress of FIG. 1 according to an exemplary embodiment.

In an exemplary embodiment, as illustrated in FIG. 5 with continuing reference to FIGS. 1-4, the topper unit 18 includes a cover 34, an encasement 36, removable topper cartridges 38 and 40, and a quilted panel 42.

In an exemplary embodiment, the cover 34 includes an open-top portion 34a including sides 34aa, 34ab, 34ac, 34ad and 34ae, which define an internal region 34af. A cover portion 34b is hingedly coupled at or near the top edge of the side 34ac of the open-top portion 34a, and is adapted to pivot about the top edge of the side 34ac in order to enclose the internal region 34af, for reasons to be described. The cover portion 34b defines edges 34ba, 34bb, 34bc and 34bd, with the edge 34bc being hingedly coupled at or near the top edge of the side 34ac of the open-top portion 34a, and further defines a side portion 34be. A zipper connection 34c extends along the sides 34aa, 34ad and 34ab of the open-top portion 34a, at or near the top edges thereof. A zipper connection 34d extends along the edges 34ba, 34bb and 34bd of the cover portion 34b, and is adapted to mate with and form a zipper connection with the zipper connection 34c in order to couple the cover portion 34b to the open-top portion 34a and thereby enclose the internal region 34af, for reasons to be described. In several exemplary embodiments, instead of, or in addition to the zipper connections 34c and 34d, a wide variety of fastening systems, devices and/or techniques are employed to couple the cover portion 34b to the open-top portion 34a and thereby enclose the internal region 34af, such as, for example, Velcro® fasteners, straps, folds, buttons, and/or any combination thereof. In several exemplary embodiments, the cover 34 is composed of or includes natural material, synthetic material, fabric material, and/or any combination thereof. In several exemplary embodiments, the zipper connection 34c is vertically positioned at any point along the height of the cover 34, and the cover portion 34b includes a height dimension to accommodate this variation in the vertical position of the zipper connection 34c. In an exemplary embodiment, the open-top portion 34a and the cover portion 34b are mirror images of one another, or near mirror images of one another, and thus form a clam-shell arrangement. In an exemplary embodiment, the cover 34 is flipped over so that the cover portion 34b is removably disposed on the bottom side of the cover 34.

In an exemplary embodiment, the encasement 36 is in the form of a four-sided box and includes sides 36a, 36b, 36c and 36d, which define an internal region 36e. In an exemplary embodiment, the encasement 36 is a foam encasement, with the sides 36a, 36b, 36c and 36d being composed of, and/or including, one or more types of foam. In an exemplary embodiment, the encasement 36 is a foam encasement composed of a relatively firm foam rubber such as a high resiliency, high density urethane foam. In an exemplary embodiment, the inside surfaces of the sides 36a, 36b, 36c and 36d defining the internal region 36e are lined with fabric such as, for example, a non-woven fabric.

In an exemplary embodiment, the topper cartridge 38 includes a cushion panel 38a enclosed or wrapped within a sleeve 38b. A Velcro® fastener (not shown) is coupled to a side 38ba of the sleeve 38b. In an exemplary embodiment, the cushion panel 38a is or includes a foam cushion. In several exemplary embodiments, the cushion panel 38a is composed of, or includes, a foam material, a polyurethane material, a latex material, one or more materials having open-cell structures, one or more optimized viscoelastic foams, one or more viscoelastic components, one or more other types of cushioning material, one or more types of memory foam, one or more springs, and/or any combination thereof. In an exemplary embodiment, the cushion panel 38a includes a plurality of 2.5" microcoil springs and a 1" layer of latex. In an exemplary embodiment, one or more labels are coupled to the sleeve 38b, and indicate the composition of the cushion panel 38a. In an exemplary embodiment, the topper cartridge 38 includes a plurality of topper cartridges and/or cushion panels.

In an exemplary embodiment, the topper cartridge 40 includes a cushion panel 40a enclosed or wrapped within a sleeve 40b. A Velcro® fastener 40c is coupled to a side 40ba of the sleeve 40b, and is adapted to mate with the Velcro® fastener coupled to the side 38ba of the sleeve 38b to thereby couple the topper cartridges 38 and 40 together, under conditions to be described. In an exemplary embodiment, the cushion panel 40a is or includes a foam cushion. In several exemplary embodiments, the cushion panel 40a is composed of, or includes, a foam material, a polyurethane material, a latex material, one or more materials having open-cell structures, one or more optimized viscoelastic foams, one or more viscoelastic components, one or more other types of cushioning material, one or more types of memory foam, one or more springs, and/or any combination thereof. In an exemplary embodiment, the cushion panel 40a includes a plurality of 2.5" microcoil springs and a 1" layer of latex. In an exemplary embodiment, one or more labels are coupled to the sleeve 40b, and indicate the composition of the cushion panel 40a. In an exemplary embodiment, the topper cartridge 40 includes a plurality of topper cartridges and/or cushion panels.

In an exemplary embodiment, the cushion panel 38a and the cushion panel 40a are composed of different material or materials. In an exemplary embodiment, the cushion panel 38a and the cushion panel 40a are composed of the same material or materials.

In several exemplary embodiments, instead of, or in addition to the Velcro® fastener 40c on the sleeve 40b and the corresponding Velcro® fastener on the side 38ba of the sleeve 38b, a wide variety of fastening systems, devices and/or techniques are employed to couple the topper cartridges 38 and 40 together, such as, for example, straps, folds, buttons, and/or any combination thereof.

In an exemplary embodiment, the quilted panel 42 is coupled to the side portion of the cover portion 34b opposing the side portion 34be. In an exemplary embodiment, the quilted panel 42 is removably coupled to the side portion of the cover portion 34b opposing the side portion 34be. In an exemplary embodiment, the quilted panel 42 includes one or more cushioning materials or layers.

In an exemplary embodiment, with continuing reference to FIGS. 1-5, when the custom mattress 14 is an assembled condition and thus the topper unit 18 is an assembled condition, as shown in FIG. 1, the topper cartridges 38 and 40 are coupled together via the fastener 40c and the corresponding fastener on the side 38ba of the sleeve 38b. The topper cartridges 38 and 40 extend within the region 36e of the encasement 36 so that the upper surfaces of the topper cartridges 38 and 40 are generally flush with the upper edges of the sides 36a, 36b, 36c and 36d of the encasement 36, and so that the lower surfaces of the topper cartridges 38 and 40 are generally flush with the lower edges of the sides 36a, 36b, 36c and 36d of the encasement 36. The topper cartridges 38 and 40, and the encasement 36, are removably disposed and extend within the region 34af of the cover portion 34a of the cover 34. The cover portion 34b is pivoted about the edge 34bc so that the zipper connection 34d mates with and forms a zipper connection with the zipper connection 34c, thereby enclosing the region 34af and thus the encasement 36 and the topper cartridges 38 and 40.

In an exemplary embodiment, with continuing reference to FIGS. 1-5, when the mattress is in an assembled condition as shown in FIG. 1, the topper unit 18 is removably coupled to the core unit 16 so that the topper cartridge 38 is generally aligned with the core cartridges 26a-26h, and so that the topper cartridge 40 is generally aligned with the core cartridges 26i-26p. In several exemplary embodiments, the removable coupling between the topper unit 18 and the core unit 16 is formed by one or more fasteners extending between the topper unit 18 and the core unit 16, such as one or more straps or Velcro® fasteners extending between the topper unit 18 and the core unit 16. In an exemplary embodiment, the removable coupling between the topper unit 18 and the core unit 16 is formed as a result of the topper unit 18 resting on the core unit 16.

Figure 6:
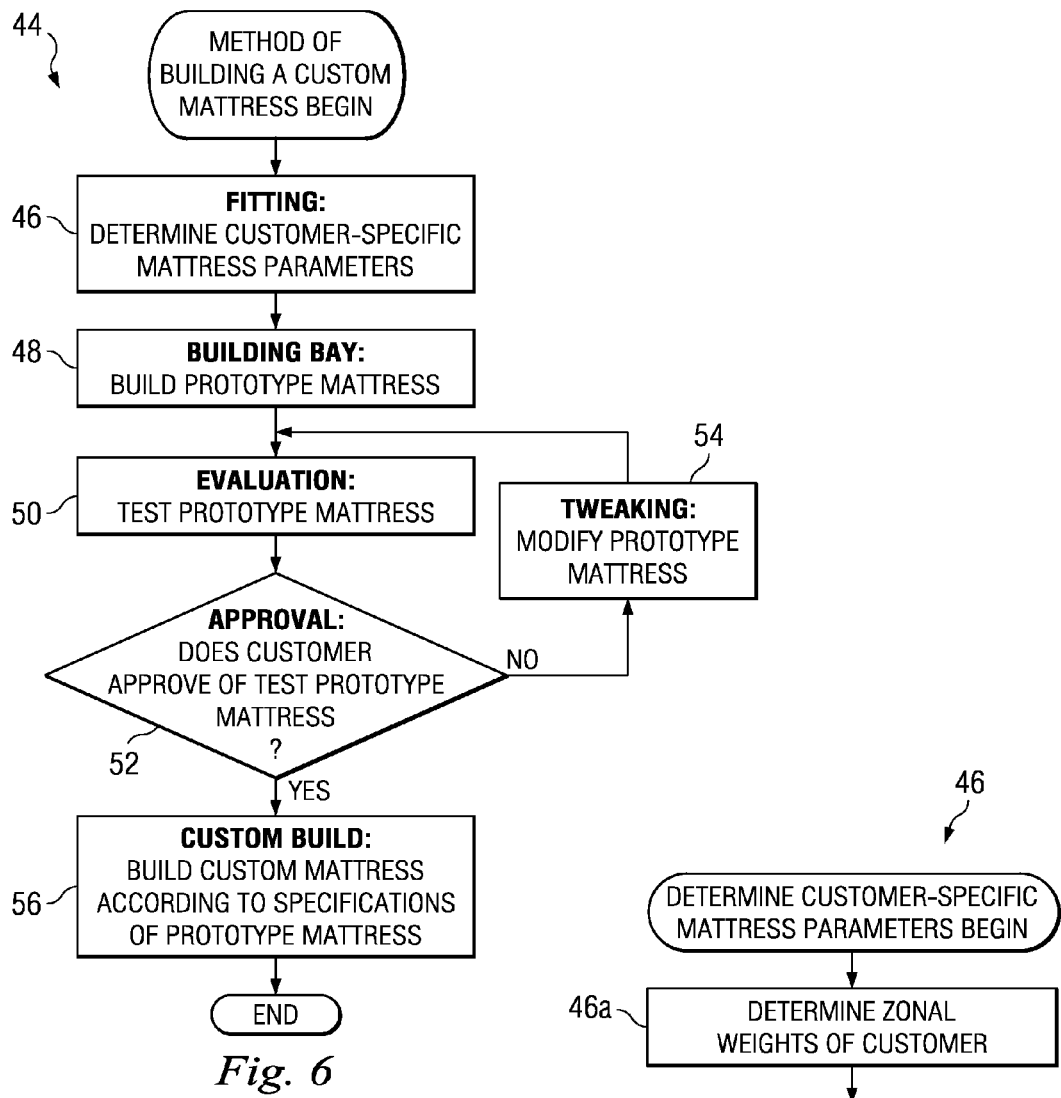
FIG. 6 is a flow chart illustration of a method of building the custom mattress of FIG. 1 according to an exemplary embodiment, the method including determining customer-specific mattress parameters, and building a prototype mattress.

In an exemplary embodiment, as illustrated in FIG. 6 with continuing reference to FIGS. 1-5, a method 44 of building the custom mattress 14 includes determining customer-specific mattress parameters in step 46, building a prototype mattress in step 48, and testing the prototype mattress in step 50. In step 52, it is determined whether the customer approves of the prototype mattress. If not, then the prototype mattress is modified in step 54, and the steps 50, 52 and 54 are repeated until the customer approves of the prototype mattress in the step 52. If the customer does approve of the prototype mattress in the step 52, then a custom mattress is built according to the specifications of the approved prototype mattress in step 56. As used herein, in an exemplary embodiment, the term "customer" refers to two persons who plan to regularly sleep on the custom mattress 14. In several exemplary embodiments, the term "customer" may also refer to one person who plans to regularly sleep alone on the custom mattress 14, or three or more persons who plan to regularly sleep on the custom mattress 14.

Figure 7:
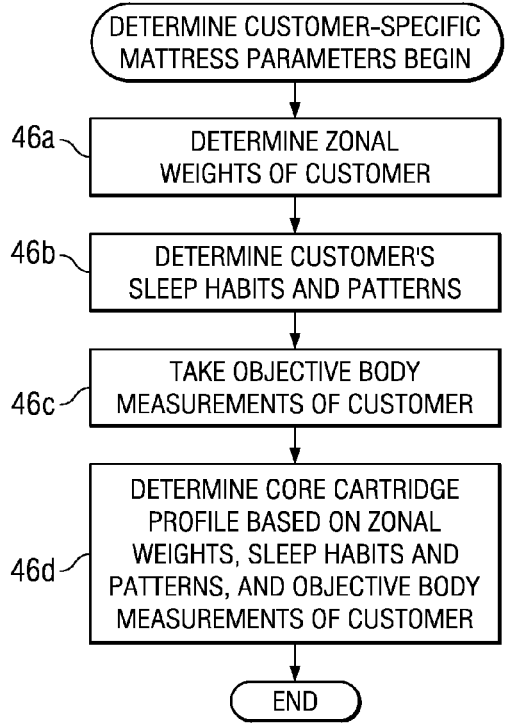
FIG. 7 is a flow chart illustration of the step of determining customer-specific mattress parameters of FIG. 6 according to an exemplary embodiment, the step including determining zonal weights of a customer, determining the customer's sleep habits and patterns, and taking objective body measurements of the customer.

In an exemplary embodiment, as illustrated in FIG. 7 with continuing reference to FIGS. 1-6, to determine customer-specific mattress parameters in the step 46 of the method 44, the zonal weights of the customer are determined in step 46a. Before, during or after the step 46a, the customer's sleep habits and patterns are determined in step 46b. Before, during or after the steps 46a and 46b, objective body measurements of the customer are taken in step 46c. After the steps 46a, 46b and 46c, a core cartridge profile is determined in step 46d, with the core cartridge profile being at least partially based on the zonal weights, sleep habits and patterns, and objective body measurements of the customer.

Figures 8, 9:
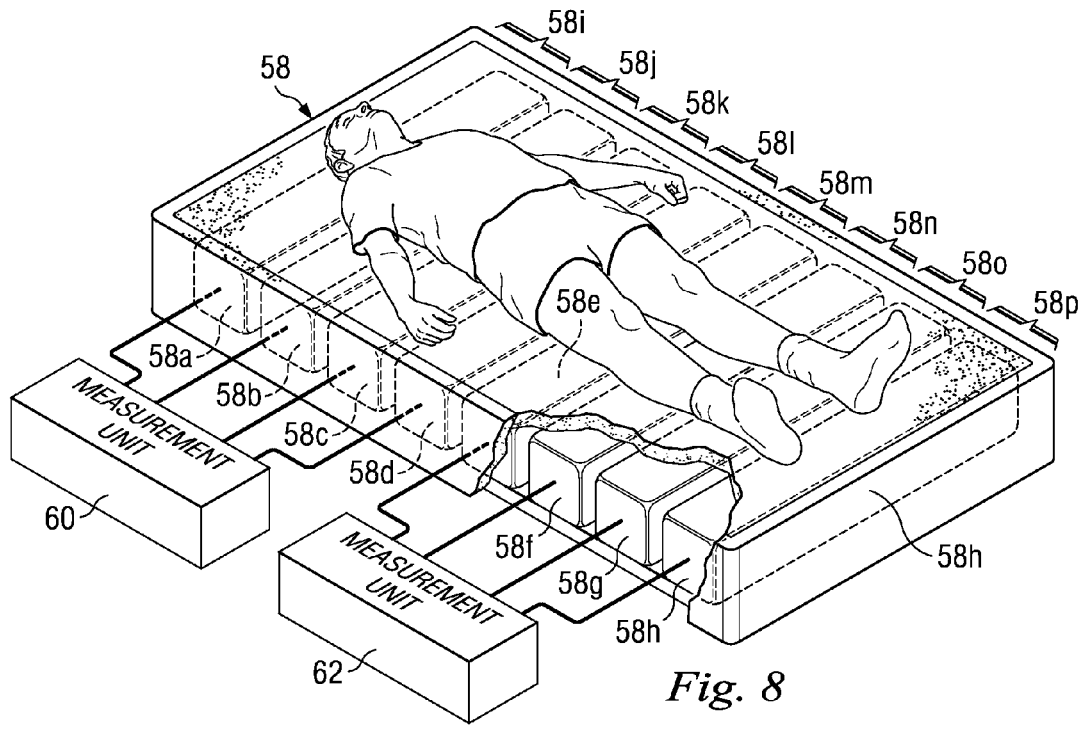
FIG. 8 is a partial perspective/partial diagrammatic view of a test bench and measurement units coupled thereto according to respective exemplary embodiments, which are used in the step of determining the zonal weights of the customer of FIG. 7 according to an exemplary embodiment.
FIG. 9 is a perspective view of a portion of a survey according to an exemplary embodiment, which is used in the step of determining the customer's sleep habits and patterns of FIG. 7 according to an exemplary embodiment.

In an exemplary embodiment, as illustrated in FIG. 8 with continuing reference to FIGS. 1-7, to determine the zonal weights of the customer in the step 46a, a test bench, such as an air mattress 58, is provided, with the air mattress 58 including air bladders 58a-58h, each of which is fluidically isolated from the other air bladders. The air bladders 58a-58h define zones 58i-58p, respectively, of the air mattress 58. Each of the air bladders 58a-58d is operably coupled to a measurement unit 60, and each of the air bladders 58e-58h is operably coupled to a measurement unit 62. In operation, to determine the zonal weights of the customer in the step 46a, one of the two persons collectively defined as the customer lies down across the zones 58i-58p of the air mattress 58. The measurement unit 60 measures the respective pressure differentials in the air bladders 58a-58d, which pressure differentials are generated as a result of the one of the two persons collectively defined as the customer lying down across the zones 58i-58l, thereby determining the zonal weights in the zones 58i-58l. Similarly, the measurement unit 62 measures the respective pressure differentials in the air bladders 58e-58h, which pressure differentials are generated by the one person laying down across the zones 58m-58p, thereby determining the zonal weights in the zones 58m-58p. In several exemplary embodiments, instead of, or in addition to pressure differentials, the measurement units 60 and 62 measure force differentials, displacements, other physical parameters generated as a result of the one person lying down across the zones 58i-58l, and/or any combination thereof. After the zonal weights for the one of the two persons collectively defined as the customer is determined, the zonal weights for the other of the two persons collectively defined as the customer is determined, in accordance with the foregoing, thereby completing the step 46a.

In several exemplary embodiments, instead of, or in addition to air, the air bladders 58a-58h may be filled with liquid, gel, other types of gases, other types of fluidic materials, other types of materials, and/or any combination thereof.

In an exemplary embodiment, as illustrated in FIG. 9 with continuing reference to FIGS. 1-8, to determine the customer's sleep habits and patterns in the step 46b, a questionnaire or survey 64 is provided that includes a series of questions 66, which includes a question as to which side of the body a person sleeps on, whether a person sleeps with a pillow, etc. Each of the two persons collectively defined as the customer takes a separate survey for himself or herself, thereby completing the step 46b. In an exemplary embodiment, in the step 46b, in addition to, or instead of the each of the two persons collectively defined as the customer taking a separate survey for himself or herself, the each of the two persons takes a survey for the other person.

Figure 10:
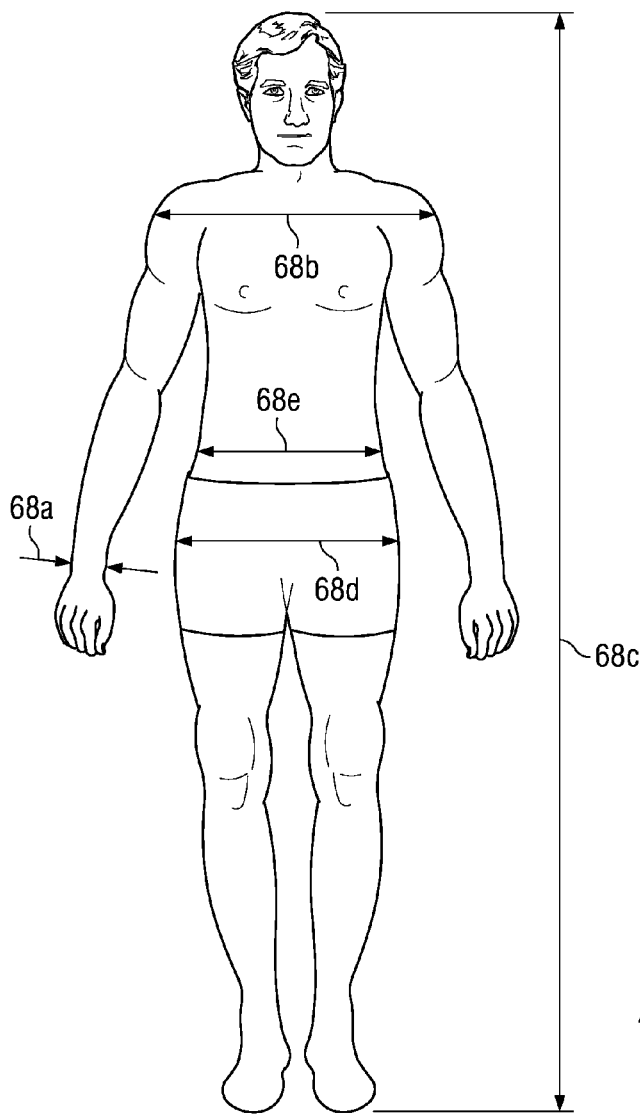
FIG. 10 is a diagrammatic view of objective body measurements according to an exemplary embodiment, which are used in the step of taking objective body measurements of the customer of FIG. 7 according to an exemplary embodiment.

In an exemplary embodiment, as illustrated in FIG. 10 with continuing reference to FIGS. 1-9, to take objective body measurements of the customer in the step 46c, measurements of each of the persons collectively defined as the customer are taken, including, for example, a wrist measurement 68a, a shoulders measurement 68b, a height measurement 68c, a hips measurement 68d, a waist measurement 68e, and/or any combination thereof.

In an exemplary embodiment, to determine the core cartridge profile in the step 46d, the zonal weights of the customer determined in the step 46a, the sleep habits and patterns of the customer determined in the step 46b, and the objective body measurements of the customer taken in the step 46c, are considered and provide the basis for the core cartridge profile for the custom mattress 14, which specifies the optimum specific pressure resistance value and/or firmness/support characteristic for each of the core cartridges 26a-26p.

In an exemplary embodiment, the zonal weights in the zones 58i-58p for the one of the two persons collectively defined as the customer are relatively significant factors in specifying the optimum pressure resistance values and/or firmness/support characteristics for the core cartridges 26a-26h, respectively. Similarly, the zonal weights in the zones 58i-58p for the other of the two persons collectively defined as the customer are relatively significant factors in specifying the optimum pressure resistance values and/or firmness/support characteristics for the core cartridges 26i-26p, respectively.

In an exemplary embodiment, the core cartridge profile for the custom mattress 14 is determined in the step 46d by the execution of a plurality of instructions stored in a computer readable medium, with the execution of the instructions being carried out by a computer or processor operably coupled to the computer readable medium, with the execution of the instructions being dependent upon inputs corresponding to, and/or based on, the zonal weights of the customer determined in the step 46a, the sleep habits and patterns of the customer determined in the step 46b, and the objective body measurements of the customer taken in the step 46c. In an exemplary embodiment, the core cartridge profile for the custom mattress 14 is determined in the step 46d using a chart, with the chart being read or analyzed in conjunction with the zonal weights of the customer determined in the step 46a, the sleep habits and patterns of the customer determined in the step 46b, and the objective body measurements of the customer taken in the step 46c. In an exemplary embodiment, the core cartridge profile for the custom mattress 14 is determined in the step 46d based on historical and/or empirical data and/or trends, with historical and/or empirical data and/or trends being read or analyzed in conjunction with the zonal weights of the customer determined in the step 46a, the sleep habits and patterns of the customer determined in the step 46b, and the objective body measurements of the customer taken in the step 46c.

Figure 11:
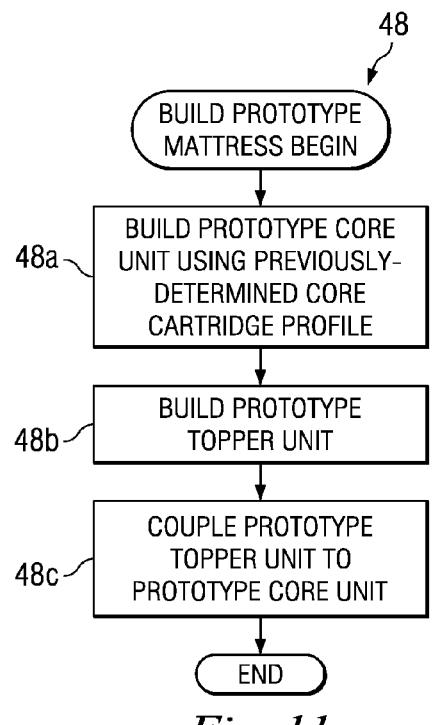
FIG. 11 is a flow chart illustration of the step of building a prototype mattress according to an exemplary embodiment, the step including building a prototype core unit, building a prototype topper unit, and coupling the prototype topper unit to the prototype core unit.

In an exemplary embodiment, as illustrated in FIG. 11 with continuing reference to FIGS. 1-10, the building of the prototype mattress in the step 48 of the method 44 is set forth below. The above-identified combinations of component terms and reference numerals used to refer to the mattress 14 and the components thereof, including the term and reference numeral combination of mattress 14, will also be used to refer to the prototype mattress and the components thereof, except that the term "prototype" will precede the respective combinations of component terms and reference numerals.

In an exemplary embodiment, as illustrated in FIG. 11 with continuing reference to FIGS. 1-10, to build the prototype mattress 14 in the step 48 of the method 44, the prototype core unit 16 is built in step 48a using the core cartridge profile previously determined in the step 46a, the prototype topper unit 18 is built in step 48b, and the prototype topper unit 18 is coupled to the prototype core unit 16 in step 48c.

Figure 12:
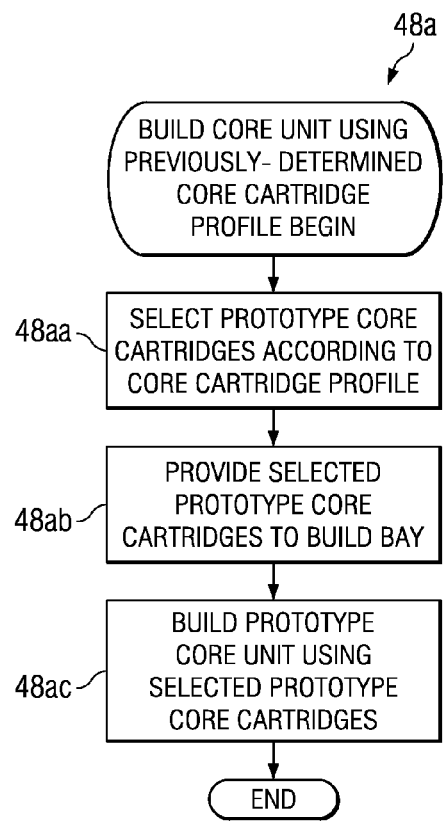
FIG. 12 is a flow chart illustration of the step of building the prototype core unit of FIG. 11 according to an exemplary embodiment, the step including selecting prototype core cartridges, providing the selected prototype core cartridges, and building the prototype core unit using the selected prototype core cartridges.

In an exemplary embodiment, as illustrated in FIG. 12 with continuing reference to FIGS. 1-11, to build the prototype core unit 16 in the step 48a, the prototype core cartridges 26a-26p are selected in step 48aa according to the core cartridge profile previously determined in the step 46d, the selected prototype core cartridges 26a-26p are provided in step 48ab to a build area or build bay 70, and the prototype core unit 16 is built in step 48ac using the selected prototype core cartridges 26a-26p.

Figure 13:
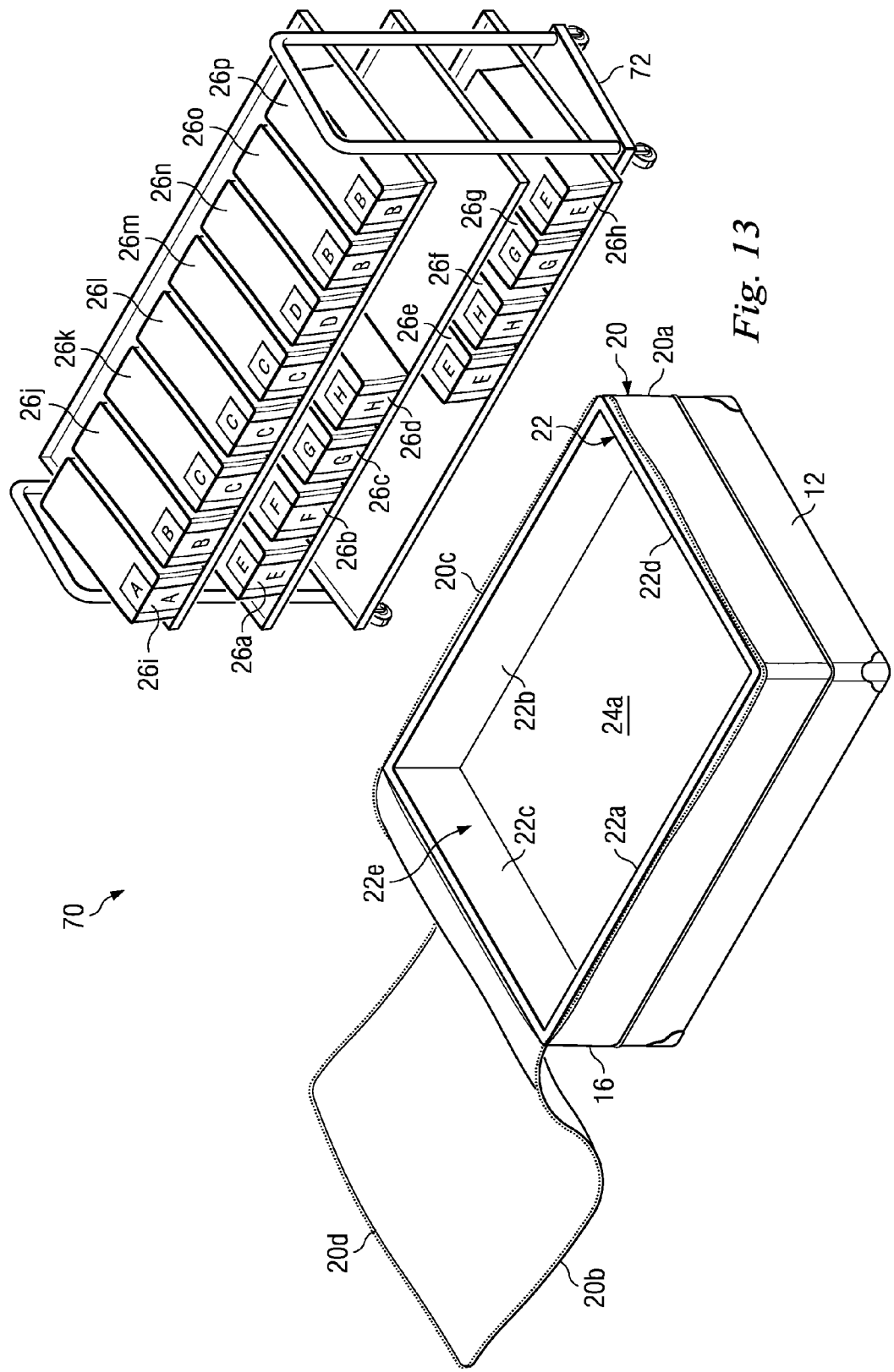
FIG. 13 is a perspective view of a cart, the selected prototype core cartridges, and components of the prototype core unit according to respective exemplary embodiments, which are used in the step of building the core unit of FIG. 11 according to an exemplary embodiment.

In an exemplary embodiment, as illustrated in FIG. 13 with continuing reference to FIGS. 1-12, to select the prototype core cartridges 26a-26p in the step 48aa, the prototype core cartridges 26a-26p are selected according to the core cartridge profile determined in the step 46d of the step 46 of the method 44. That is, the specific pressure resistance values and/or firmness/support characteristics of the selected prototype core cartridges 26a-26h match, or most nearly match, the optimum specific pressure resistance values and/or firmness/support characteristics of the core cartridges 26a-26h, respectively, specified by the core cartridge profile determined in the step 46d, with these optimum values and/or characteristics being based on the other customer-specific parameters determined in the step 46, namely the zonal weights determined in the step 46a, the sleep habits and patterns determined in the step 46b, and the objective body measurements taken in the step 46c of one of the persons collectively defined as the customer; likewise, the specific pressure resistance values and/or firmness/support characteristics of the selected prototype core cartridges 26i-26p match, or most nearly match, the optimum specific pressure resistance values and/or firmness/support characteristics of the core cartridges 26i-26p, respectively, specified by the core cartridge profile determined in the step 46d, with these optimum values and/or characteristics being based on the other customer-specific parameters determined in the step 46, namely the zonal weights determined in the step 46a, the sleep habits and patterns determined in the step 46b, and the objective body measurements taken in the step 46c of the other of the persons collectively defined as the customer.

In an exemplary embodiment, if the customer is one person who plans to regularly sleep alone on the custom mattress 14, then the specific pressure resistance values and/or firmness/support characteristics of the selected prototype core cartridges 26a-26h are equal to the specific pressure resistance values and/or firmness/support characteristics of the selected prototype core cartridges 26i-26p, respectively.

In an exemplary embodiment, as illustrated in FIG. 13 with continuing reference to FIGS. 1-12, to provide the selected prototype core cartridges 26a-26p in the step 48ab after the prototype core cartridges 26a-26p are selected in the step 48aa, the selected prototype core cartridges 26a-26p are placed on a cart 72, and the cart 72 is moved to the build bay 70.

In an exemplary embodiment, as illustrated in FIGS. 13 and 14 with continuing reference to FIGS. 1-12, to build the prototype core unit 16 using the selected prototype core cartridges 26a-26p in the step 48ac, the prototype box platform 12 is disposed in the build bay 70, the prototype cover 20 is disposed on the prototype box platform 12, and the prototype encasement 22 and the prototype cushion layer 24a are removably disposed in the region 20af of the prototype cover 20. The prototype core cartridge 26a is removably disposed in the region 22e of the prototype encasement 22, and is adjacent the sides 22c and 22a of the prototype encasement 22. The prototype core cartridge 26h is removably disposed in the region 22e of the prototype encasement 22, and is adjacent the sides 22d and 22a of the prototype encasement 22. The prototype core cartridges 26b-26g are removably disposed between the prototype core cartridges 26a and 26h, and are adjacent the side 22a of the prototype encasement 22. As a result, the portion of the prototype core cartridge profile defined by the prototype core cartridges 26a-26h matches, or nearly matches, the corresponding portion of the core cartridge profile determined in the step 46*d* for the one of the two persons collectively defined as the customer. Similarly, the prototype core cartridge 26*i* is removably disposed in the region 22*e* of the prototype encasement 22, and is adjacent the sides 22*c* and 22*b* of the prototype encasement 22. The prototype core cartridge 26*p* is removably disposed in the region 22*e* of the prototype encasement 22, and is adjacent the sides 22*d* and 22*b* of the prototype encasement 22. The prototype core cartridges 26*b*-26*g* are removably disposed between the prototype core cartridges 26*i* and 26*p*, and are adjacent the side 22*b* of the prototype encasement 22. As a result, the portion of the prototype core cartridge profile defined by the prototype cartridges core 26*i*-26*p* matches, or nearly matches, the corresponding portion of the core cartridge profile determined in the step 46*d* for the other of the two persons collectively defined as the customer. The remainder of the prototype core unit 16 is built in accordance with the foregoing description of the core unit 16 and therefore these steps will not be described in further detail.

In an exemplary embodiment, as illustrated in FIG. 15 with continuing reference to FIGS. 1-14, to build the prototype topper unit 18 in the step 48*b* of the step 48 of the method 44, the prototype topper cartridges 38 and 40 are selected in step 48*ba*, and the prototype topper unit 18 is built in step 48*bb* using the selected prototype topper cartridges 38 and 40.

In an exemplary embodiment, in the step 48*ba*, the prototype topper cartridges 38 and 40 are selected based on the core cartridge profile determined in the step 46*d*. In an exemplary embodiment, the prototype topper cartridge 38 is selected on the basis of the portion of the core cartridge profile determined in the step 46*d* for the one of the two persons collectively defined as the customer. In an exemplary embodiment, the prototype topper cartridge 40 is selected on the basis of the portion of the core cartridge profile determined in the step 46*d* for the other of the two persons collectively defined as the customer. In an exemplary embodiment, the prototype topper cartridges 38 and 40 are selected on the basis of the composition of, and/or the materials included in, the cushion panels 38*a* and 40*a*, respectively, which basis is informed by one or more of the customer-specific parameters determined in the step 46 of the method 44.

Figure 16:
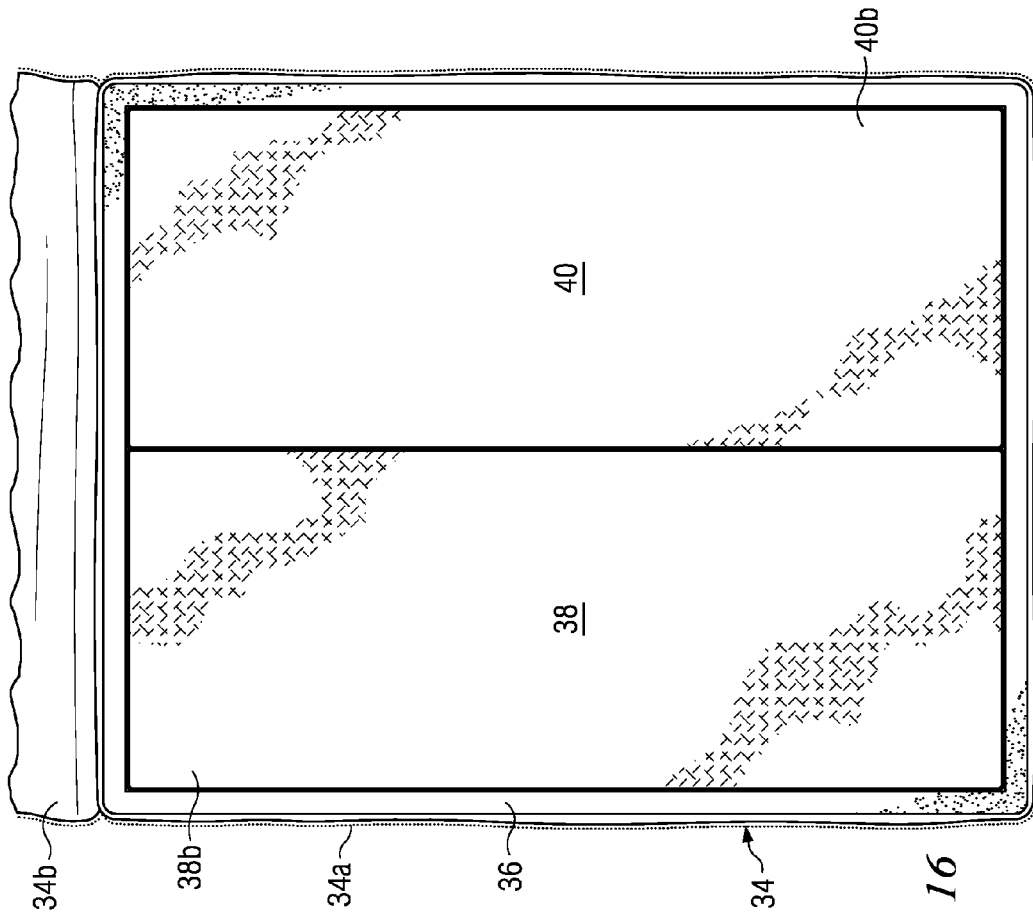
FIG. 16 is a perspective view of the prototype topper cartridges and components of the prototype topper unit according to respective exemplary embodiments, which are used in the step of building the prototype topper unit of FIG. 11.

In an exemplary embodiment, as illustrated in FIG. 16 with continuing reference to FIGS. 1-15, to build the prototype topper unit 18 in the step 48*bb* using the selected prototype topper cartridges 38 and 40, the prototype topper cartridges 38 and 40 are coupled together in accordance with the foregoing description of the topper unit 18, and are removably disposed in the region 36*e* of the prototype encasement 36, which, in turn, is removably disposed in the region 34*af* of the prototype cover 34. The remainder of the prototype topper unit 18 is built in accordance with the foregoing description of the topper unit 18 and therefore these steps will not be described in further detail.

In an exemplary embodiment, to couple the prototype topper unit 18 to the prototype core unit 16 in the step 48*c*, the prototype topper unit 18 is coupled to the prototype core unit 16 in accordance with the foregoing description of the assembled condition of the mattress 14, thereby completing the step 48 of the method 44.

In an exemplary embodiment, as noted above, after the prototype mattress 14 is built in the step 48, the prototype mattress 14 is tested in the step 50. To test the prototype mattress 14 in the step 50, the one of the two persons collectively defined as the customer lies down across the prototype mattress 14 so that he or she lies down across the prototype cartridge topper 38 and the prototype core cartridges 26*a*-26*h*, and the other of the two persons collectively defined as the customer either simultaneously or subsequently lies down across the prototype mattress 14 so that he or she lies down across the prototype cartridge topper 40 and the prototype core cartridges 26*i*-26*p*.

In an exemplary embodiment, as noted above, it determined in the step 52 as to whether the customer approves of the prototype mattress 14. To determine whether the customer approves of the prototype mattress 14 in the step 52, customer feedback and response is elicited, and the customer's response to lying on the prototype mattress 14 is observed.

In an exemplary embodiment, as noted above, if the customer does not approve of the prototype mattress 14 in the step 52, then the prototype mattress 14 is modified in the step 54. To modify the prototype mattress 14, one or more of the prototype core cartridges 26*a*-26*p* are replaced, and/or one or more of the prototype topper cartridges 38 and 40 are replaced, in response to the elicited customer feedback and response, and/or in response to any observations of the customer's response to lying on the prototype mattress 14. As a result, the pressure resistance values and/or firmness/support characteristics of the prototype topper cartridges 38 and 40 and the prototype core cartridges 26*a*-26*p*, and thus the prototype mattress 14, are modified in response to the elicited customer feedback and response, and/or in response to any observations of the customer's response to lying on the prototype mattress 14.

In an exemplary embodiment, during the step 54, the respective labels 32 on the prototype core cartridges 26*a*-26*p* facilitate the easy and accurate identification of the respective types of the cartridges, and/or of the respective pressure resistance values and/or firmness/support characteristics of the cartridges.

In an exemplary embodiment, as noted above, the testing of the prototype mattress 14 in the step 50 is then repeated after modifying the prototype mattress 14 in the step 54. The steps 50, 52 and 54 are repeated until it is determined that the customer approves of the prototype mattress 14 in the step 52.

In an exemplary embodiment, as noted above, if the customer approves of the prototype mattress 14 in the step 52, then the custom mattress 14 described above with reference to FIGS. 1-5 is built in the step 56 according to the specifications of the approved prototype mattress 14. The core cartridges 26*a*-26*p*, and the topper cartridges 38 and 40, in the custom mattress 14 built in the step 56 are substantially identical to the prototype core cartridges 26*a*-26*p*, and the prototype topper cartridges 38 and 40, respectively, included in the prototype mattress 14 approved in the step 52.

In an exemplary embodiment, in the step 56, instead of the built custom mattress 14 and the prototype mattress 14 being different mattresses, the custom mattress 14 built in the step 56 is the same mattress as the prototype mattress 14 approved in the step 52.

In an exemplary embodiment, in the step 56, the custom mattress 14 is built in a delivery truck before, during or after transit to the delivery location of the custom mattress 14. In an exemplary embodiment, in the step 56, the custom mattress 14 is built in the build bay 70, and/or in a location proximate the build bay 70. In an exemplary embodiment, the custom mattress 14 is built in the step 56 at a retail location. In an exemplary embodiment, the custom mattress 14 is built in the step 56 at a location remote from either a retail location and/or the build bay 70. In an exemplary embodiment, the custom mattress 14 is built in the customer's bedroom.

In operation, in an exemplary embodiment, the custom mattress 14 rests on, and is supported by, the box platform 12. When the customer lies on the custom mattress 14, the core unit 16 provides support and comfort to the customer, and the topper unit 18 distributes the loading created by the customer lying on the custom mattress 14, thereby providing further comfort to the customer. The respective pluralities of springs 28 in the cartridges 26a-26p permit air flow therebetween and through the custom mattress 14, thereby permitting any heat transferred to the bed 10 to dissipate more easily and quickly. Since the custom mattress 14 has been built according to the above-described customer-specific parameters, the custom mattress 14 optimally fits the curvature of the customer's spine and thus provides a generally spine-neutral condition, optimally distributes the weight of the customer, and optimally accommodates the customer's soft tissue between the customer's spine and edge of skin.

During operation, in an exemplary embodiment, the topper cartridge 38 and the core cartridges 26a-26h enable the half portion of the bed 10 on which the one of the two persons collectively defined as the customer sleeps to optimally fit the curvature of the one person's spine and thus provide a generally spine-neutral condition, to optimally distribute the weight of the one person, and to optimally accommodate the one person's soft tissue between the spine and edge of skin; similarly, the topper cartridge 40 and the core cartridges 26i-26p enable the half portion of the bed 10 on which the other of the two persons collectively identified as the customer sleeps to optimally fit the curvature of the other person's spine and thus provide a generally spine-neutral condition, to optimally distribute the weight of the other person, and to optimally accommodate the other person's soft tissue between the spine and edge of skin. As a result, the custom mattress 14 accommodates the different physique, girth, weight, etc. of each of the two persons collectively defined as the customer, and further accommodates variations in physique, girth, weight, etc. along the body length of each of the two persons collectively defined as the customer.

During operation, in an exemplary embodiment, the frame 22 provides support characteristics that aid the customer as he, she or they ingress and egress to and from the sleeping surface of the custom mattress 14, and that prevent the customer from rolling off of the sleeping surface.

Figure 17:
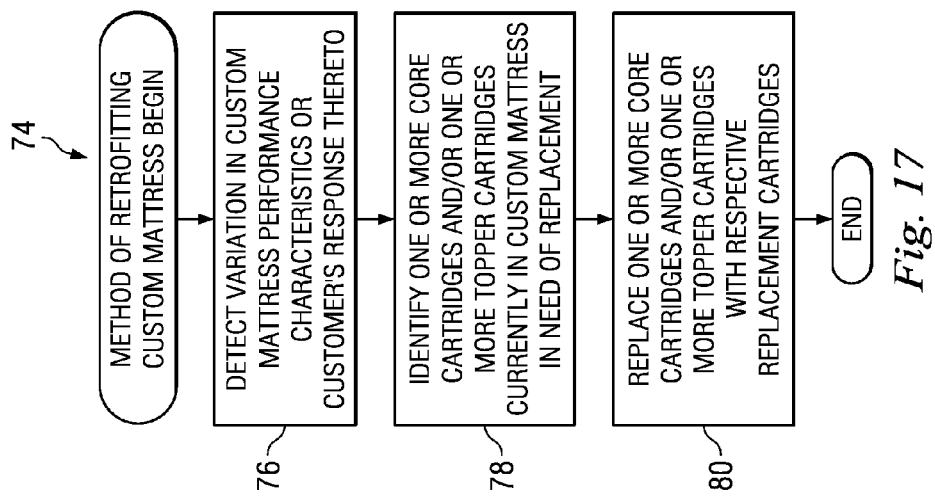
FIG. 17 is a flow chart illustration of a method of retrofitting the custom mattress of FIG. 1 according to an exemplary embodiment, the method including identifying one or more core cartridges and/or one or more topper cartridges in need of replacement.

In an exemplary embodiment, as illustrated in FIG. 17 with continuing reference to FIGS. 1-16, a method 74 of retrofitting the custom mattress 14 includes detecting any variations in the performance characteristics of the custom mattress 14 and/or the customer's response thereto in step 76, identifying one or more of the core cartridges 26a-26p and/or one or more of the topper cartridges 38 and 40 in the custom mattress 14 in need of replacement in step 78, and replacing in step 80 the cartridges identified in the step 78.

In an exemplary embodiment, to detect any variations in the performance characteristics of the custom mattress 14 in the step 76, the customer detects a difference in how the custom mattress 14 feels and/or performs over a period of time, such as several years. In an exemplary embodiment, to detect any variation in the customer's response to the performance characteristics of the custom mattress 14 in the step 76, the customer detects their, his or her discomfort with the custom mattress 14 after the custom mattress 14 has been delivered to their, his or her home, or after at least portions of the mattress 14 have experienced wear and/or tear over time. In an exemplary embodiment, to detect any variation in the customer's response to the performance characteristics of the custom mattress 14 in the step 76, the customer wishes to change the feel of the mattress 14 for any reason including solely personal preference, regardless of whether the mattress 14 has experienced any type of wear and/or tear and/or performance degradation. In an exemplary embodiment, to detect any variation in the customer's response to the performance characteristics of the custom mattress 14 in the step 76, the customer detects their, his or her discomfort with the custom mattress 14 because of changes to the customer's physique, girth, weight, etc. over time.

Figure 18:
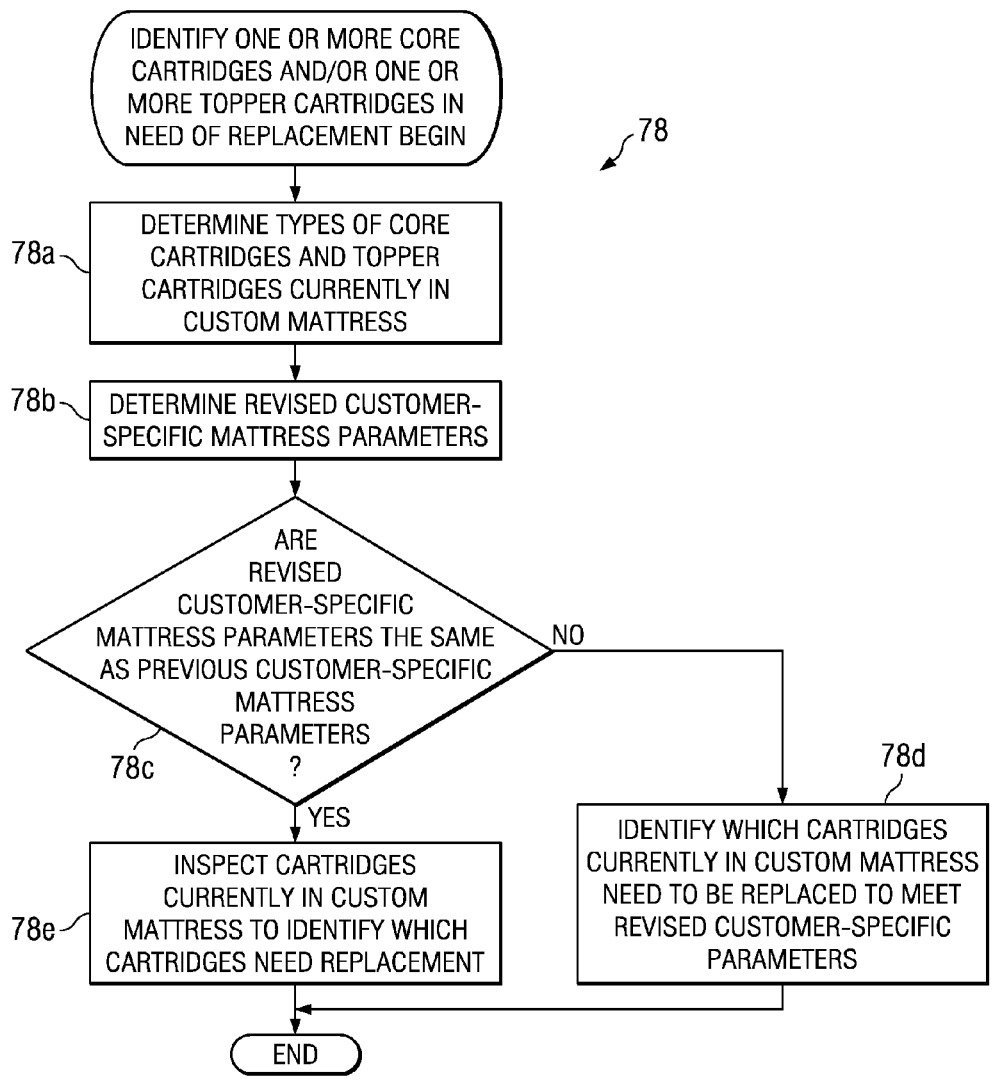
FIG. 18 is a flow chart illustration of the step of identifying one or more core cartridges and/or one or more topper cartridges in need of replacement of FIG. 17 according to an exemplary embodiment.

In an exemplary embodiment, as illustrated in FIG. 18 with continuing reference to FIGS. 1-17, to identify one or more of the core cartridges 26a-26p and/or one or more of the topper cartridges 38 and 40 in the custom mattress 14 in need of replacement in the step 78, the respective types of the core cartridges 26a-26p and the topper cartridges 38 and 40 in the custom mattress 14 are determined in step 78a, revised customer-specific parameters are determined in step 78b, and, in step 78c, the revised customer-specific parameters determined in the step 78b are compared with the customer-specific parameters determined in the step 46 of the method 44 to determine whether the two sets of parameters are the same. If not, then it is determined in step 78d which of the core cartridges 26a-26p and the topper cartridges 38 and 40 need to be replaced to meet the revised customer-specific parameters determined in the step 78b. If it is determined in the step 78c that the revised customer-specific parameters determined in the step 78b are the same as the customer-specific parameters determined in the step 46 of the method 44, then the core cartridges 26a-26p and topper cartridges 38 and 40 are inspected or tested in step 78e to identify which cartridges need replacement.

In an exemplary embodiment, to determine the respective types of the core cartridges 26a-26p in the custom mattress 14 in the step 78a, the customer decouples the topper unit 18 from the core unit 16, unzips and pulls back the cover portion 20b from the open-top portion 20a of the cover, and visually determines the types of the core cartridges 26a-26p currently in the custom mattress 14 by visually noting the color coding and/or symbols on the respective labels 32, which are visible when the cover portion 20b is unzipped and pulled back because the respective labels 32 wrap around the respective sides 30a of the core cartridges. In an exemplary embodiment, to determine the respective types of the topper cartridges 38 and 40 in the custom mattress 14 in the step 78a, the customer unzips and pulls back the cover portion 34b from the open-top portion 34a of the cover, and visually determines the types of the topper cartridges 38 and 40 currently in the custom mattress 14 by visually noting any labeling on the topper cartridges. In an exemplary embodiment, to determine the respective types of the core cartridges 26a-26p and the topper cartridges 38 and 40 in the custom mattress 14 in the step 78a, the customer calls the retail seller of the mattress 14, who then looks up the types in a database and/or computer. In an exemplary embodiment, to determine the respective types of the core cartridges 26a-26p and the topper cartridges 38 and 40 in the custom mattress 14 in the step 78a, the customer accesses a database over a network, such as a database accessible by a website over the Internet, and then looks up the types in the database. In an exemplary embodiment, to determine the respective types of the core cartridges 26a-26p and the topper cartridges 38 and 40 in the custom mattress 14 in the step 78a, the customer visits the retail seller of the mattress 14, who then looks up the types in a database and/or computer.

In an exemplary embodiment, to determine the revised customer-specific parameters in the step 78b, the step 46 described above is repeated, that is, the zonal weights of customer are determined, the customer's sleep habits and patterns are determined, objective body measurements of the customer are taken, and a core cartridge profile is determined.

In an exemplary embodiment, during the step 78, the steps 78b, 78c and 78d are omitted.

In an exemplary embodiment, the execution of the method 74 is environmentally friendly because, instead of replacing the entire custom mattress 14, only the core cartridges 26a-26p that need to be replaced are replaced, and/or only the topper cartridges 38 and 40 that need to be replaced are replaced, thereby reducing waste and energy.

In an exemplary embodiment, the execution of the method 74 is economically advantageous because, instead of incurring the cost associated with replacing the entire custom mattress 14, only the costs associated with replacing the core cartridges 26a-26p that need to be replaced, and the topper cartridges 38 and 40 that need to be replaced, are incurred.

Figure 19:
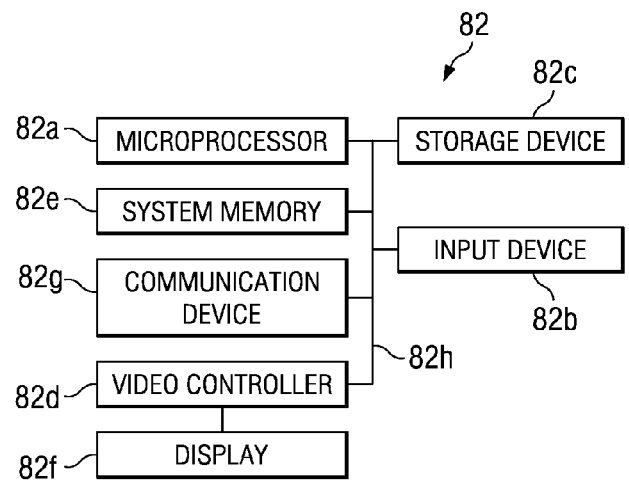
FIG. 19 is a diagrammatic illustration of a node for implementing one or more exemplary embodiments of the present disclosure.

In an exemplary embodiment, as illustrated in FIG. 19 with continuing reference to FIGS. 1-18, an illustrative node 82 for implementing one or more embodiments of one or more of the above-described elements, methods and/or steps, and/or any combination thereof, is depicted. The node 82 includes a microprocessor 82a, an input device 82b, a storage device 82c, a video controller 82d, a system memory 82e, a display 82f, and a communication device 82g, all of which are interconnected by one or more buses 82h. In several exemplary embodiments, the storage device 82c may include a floppy drive, hard drive, CD-ROM, optical drive, any other form of storage device and/or any combination thereof. In several exemplary embodiments, the storage device 82c may include, and/or be capable of receiving, a floppy disk, CD-ROM, DVD-ROM, or any other form of computer readable medium that may contain executable instructions. In several exemplary embodiments, the communication device 82g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cellular telephones.

In an exemplary embodiment, the step 46 is implemented, at least in part, using the node 82 and/or one or more components thereof. In an exemplary embodiment, the step 46d of the step 46 of the method 44 is implemented using the node 82 and/or one or more components thereof. In an exemplary embodiment, the core cartridge profile for the custom mattress 14 is determined in the step 46d by the execution of a plurality of instructions stored in the storage device 82c, the system memory 82e, one or more other computer readable mediums, and/or any combination thereof, with the execution of the instructions being carried out by the microprocessor 82a.

In an exemplary embodiment, the step 78b of the method 78 is implemented, at least in part, using the node 82 and/or one or more components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine.

In several exemplary embodiments, data structures are defined organizations of data that may enable an embodiment of the present disclosure. In an exemplary embodiment, a data structure may provide an organization of data, or an organization of executable code. In several exemplary embodiments, data signals could be carried across transmission mediums and store and transport various data structures, and, thus, may be used to transport an embodiment of the present disclosure.

In several exemplary embodiments, any networks described above may be designed to work on any specific architecture, and may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, while different steps, processes, and procedures are described as appearing as distinct acts, one or more of the steps, one or more of the processes, and/or one or more of the procedures could also be performed in different orders, simultaneously and/or sequentially. In several exemplary embodiments, the steps, processes and/or procedures could be merged into one or more steps, processes and/or procedures.

A method has been described that includes determining one or more parameters specific to a customer; building a mattress comprising specifications at least partially based on the one or more parameters; and testing the mattress to determine whether the customer approves of the mattress; wherein determining the one or more parameters specific to the customer comprises at least two of the following: determining zonal weights of the customer; determining sleep habits and patterns of the customer; and taking objective body measurements of the customer. In an exemplary embodiment, determining the one or more parameters specific to the customer comprises determining a core cartridge profile, the core cartridge profile being at least partially based on one or more of the following: the zonal weights of the customer; the sleep habits and patterns of the customer; and the objective body measurements of the customer. In an exemplary embodiment, building the mattress comprising specifications at least partially based on the one or more parameters comprises building a core unit using the core cartridge profile; building a topper unit; and removably coupling the topper unit to the core unit. In an exemplary embodiment, building the core unit using the core cartridge profile comprises providing a core cover defining a first internal region; selecting a plurality of core cartridges, each core cartridge comprising a firmness characteristic generally specified by the core cartridge profile; and disposing the plurality of core cartridges in the first internal region defined by the core cover; and wherein building the topper unit comprises providing a topper cover defining a second internal region; selecting one or more topper cartridges, the selection of each topper cartridge being at least partially based one or more of the following: the zonal weights of the customer; the sleep habits and patterns of the customer; the objective body measurements of the customer; and the core cartridge profile; and disposing the one or more topper cartridges in the second internal region defined by the topper cover. In an exemplary embodiment, the method comprises if the customer does not approve of the mattress, then modifying the mattress, comprising one or more of the following: replacing at least one core cartridge with another core cartridge; and replacing at least one topper cartridge with another topper cartridge; and repeating testing the mattress and modifying the mattress until the customer approves of the mattress in response to testing the mattress.

A method has been described that includes determining one or more parameters specific to a customer, comprising determining zonal weights of the customer; determining sleep habits and patterns of the customer; taking objective body measurements of the customer; and determining a core cartridge profile, the core cartridge profile being at least partially based on one or more of the following: the zonal weights of the customer; the sleep habits and patterns of the customer; and the objective body measurements of the customer; building a mattress comprising specifications at least partially based on the one or more parameters, comprising building a core unit using the core cartridge profile, comprising providing a core cover defining a first internal region; selecting a plurality of core cartridges, each core cartridge comprising a firmness characteristic generally specified by the core cartridge profile; and disposing the plurality of core cartridges in the first internal region defined by the core cover; building a topper unit, comprising providing a topper cover defining a second internal region; selecting one or more topper cartridges, the selection of each topper cartridge being at least partially based one or more of the following: the zonal weights of the customer; the sleep habits and patterns of the customer; the objective body measurements of the customer; and the core cartridge profile; and disposing the one or more topper cartridges in the second internal region defined by the topper cover; and removably coupling the topper unit to the core unit; testing the mattress to determine whether the customer approves of the mattress; and if the customer does not approve of the mattress, then modifying the mattress, comprising one or more of the following: replacing at least one core cartridge with another core cartridge; and replacing at least one topper cartridge with another topper cartridge; and repeating testing the mattress and modifying the mattress until the customer approves of the mattress in response to testing the mattress.

A system has been described that includes means for determining one or more parameters specific to a customer; means for building a mattress comprising specifications at least partially based on the one or more parameters; and means for testing the mattress to determine whether the customer approves of the mattress; wherein means for determining the one or more parameters specific to the customer comprises at least two of the following: means for determining zonal weights of the customer; means for determining sleep habits and patterns of the customer; and means for taking objective body measurements of the customer. In an exemplary embodiment, means for determining the one or more parameters specific to the customer comprises means for determining a core cartridge profile, the core cartridge profile being at least partially based on one or more of the following: the zonal weights of the customer; the sleep habits and patterns of the customer; and the objective body measurements of the customer. In an exemplary embodiment, means for building the mattress comprising specifications at least partially based on the one or more parameters comprises means for building a core unit using the core cartridge profile; means for building a topper unit; and means for removably coupling the topper unit to the core unit. In an exemplary embodiment, means for building the core unit using the core cartridge profile comprises means for providing a core cover defining a first internal region; means for selecting a plurality of core cartridges, each core cartridge comprising a firmness characteristic generally specified by the core cartridge profile; and means for disposing the plurality of core cartridges in the first internal region defined by the core cover; and wherein means for building the topper unit comprises means for providing a topper cover defining a second internal region; means for selecting one or more topper cartridges, the selection of each topper cartridge being at least partially based one or more of the following: the zonal weights of the customer; the sleep habits and patterns of the customer; the objective body measurements of the customer; and the core cartridge profile; and means for disposing the one or more topper cartridges in the second internal region defined by the topper cover. In an exemplary embodiment, the system comprises means for if the customer does not approve of the mattress, then modifying the mattress, comprising one or more of the following: replacing at least one core cartridge with another core cartridge; and replacing at least one topper cartridge with another topper cartridge; and repeating testing the mattress and modifying the mattress until the customer approves of the mattress in response to testing the mattress.

A system has been described that includes means for determining one or more parameters specific to a customer, comprising means for determining zonal weights of the customer; means for determining sleep habits and patterns of the customer; means for taking objective body measurements of the customer; and means for determining a core cartridge profile, the core cartridge profile being at least partially based on one or more of the following: the zonal weights of the customer; the sleep habits and patterns of the customer; and the objective body measurements of the customer; means for building a mattress comprising specifications at least partially based on the one or more parameters, comprising means for building a core unit using the core cartridge profile, comprising means for providing a core cover defining a first internal region; means for selecting a plurality of core cartridges, each core cartridge comprising a firmness characteristic generally specified by the core cartridge profile; and means for disposing the plurality of core cartridges in the first internal region defined by the core cover; means for building a topper unit, comprising means for providing a topper cover defining a second internal region; means for selecting one or more topper cartridges, the selection of each topper cartridge being at least partially based one or more of the following: the zonal weights of the customer; the sleep habits and patterns of the customer; the objective body measurements of the customer; and the core cartridge profile; and means for disposing the one or more topper cartridges in the second internal region defined by the topper cover; and means for removably coupling the topper unit to the core unit; means for testing the mattress to determine whether the customer approves of the mattress; and means for if the customer does not approve of the mattress, then modifying the mattress, comprising one or more of the following: replacing at least one core cartridge with another core cartridge; and replacing at least one topper cartridge with another topper cartridge; and repeating testing the mattress and modifying the mattress until the customer approves of the mattress in response to testing the mattress.

A method has been described that includes providing a mattress, the mattress comprising a core unit, the core unit comprising a first cover defining a first internal region and a plurality of core cartridges selected according to a first plurality of customer-specific parameters and removably disposed within the first internal region; and retrofitting the mattress, comprising identifying a core cartridge in need of replacement; and replacing the core cartridge in need of replacement with a replacement core cartridge. In an exemplary embodiment, identifying the core cartridge in need of replacement comprises determining a second plurality of customer-specific parameters; and comparing the second plurality of customer-specific parameters with the first plurality of customer-specific parameters; and identifying the core cartridge in need of replacement in response to comparing the second plurality of customer-specific parameters with the first plurality of customer-specific parameters. In an exemplary embodiment, replacing the core cartridge in need of replacement with a replacement core cartridge comprises removing the core cartridge in need of replacement from the first internal region; and removably disposing the replacement core cartridge within the first internal region after removing the core cartridge in need of replacement from the first internal region. In an exemplary embodiment, the mattress further comprises a topper unit removably coupled to the core unit, the topper unit comprising a second cover defining a second internal region and a first topper cartridge removably disposed within the second internal region; and wherein retrofitting the mattress further comprises replacing the first topper cartridge with a replacement topper cartridge, comprising removing the first topper cartridge from the second internal region; and removably disposing the replacement topper cartridge within the second internal region after removing the first topper cartridge from the second internal region. In an exemplary embodiment, identifying the core cartridge in need of replacement comprises determining a second plurality of customer-specific parameters; and comparing the second plurality of customer-specific parameters with the first plurality of customer-specific parameters; and identifying the core cartridge in need of replacement in response to comparing the second plurality of customer-specific parameters with the first plurality of customer-specific parameters; wherein replacing the core cartridge in need of replacement with a replacement core cartridge comprises removing the core cartridge in need of replacement from the first internal region; and removably disposing the replacement core cartridge within the first internal region after removing the core cartridge in need of replacement from the first internal region; wherein the mattress further comprises a topper unit removably coupled to the core unit, the topper unit comprising a second cover defining a second internal region and a first topper cartridge removably disposed within the second internal region; and wherein retrofitting the mattress further comprises replacing the first topper cartridge with a replacement topper cartridge, comprising removing the first topper cartridge from the second internal region; and removably disposing the replacement topper cartridge within the second internal region after removing the first topper cartridge from the second internal region.

A system has been described that includes means for providing a mattress, the mattress comprising a core unit, the core unit comprising a first cover defining a first internal region and a plurality of core cartridges selected according to a first plurality of customer-specific parameters and removably disposed within the first internal region; and means for retrofitting the mattress, comprising means for identifying a core cartridge in need of replacement; and means for replacing the core cartridge in need of replacement with a replacement core cartridge. In an exemplary embodiment, means for identifying the core cartridge in need of replacement comprises means for determining a second plurality of customer-specific parameters; and means for comparing the second plurality of customer-specific parameters with the first plurality of customer-specific parameters; and means for identifying the core cartridge in need of replacement in response to comparing the second plurality of customer-specific parameters with the first plurality of customer-specific parameters. In an exemplary embodiment, means for replacing the core cartridge in need of replacement with a replacement core cartridge comprises means for removing the core cartridge in need of replacement from the first internal region; and means for removably disposing the replacement core cartridge within the first internal region after removing the core cartridge in need of replacement from the first internal region. In an exemplary embodiment, the mattress further comprises a topper unit removably coupled to the core unit, the topper unit comprising a second cover defining a second internal region and a first topper cartridge removably disposed within the second internal region; and wherein means for retrofitting the mattress further comprises means for replacing the first topper cartridge with a replacement topper cartridge, comprising means for removing the first topper cartridge from the second internal region; and means for removably disposing the replacement topper cartridge within the second internal region after removing the first topper cartridge from the second internal region. In an exemplary embodiment, means for identifying the core cartridge in need of replacement comprises means for determining a second plurality of customer-specific parameters; and means for comparing the second plurality of customer-specific parameters with the first plurality of customer-specific parameters; and means for identifying the core cartridge in need of replacement in response to comparing the second plurality of customer-specific parameters with the first plurality of customer-specific parameters; wherein means for replacing the core cartridge in need of replacement with a replacement core cartridge comprises means for removing the core cartridge in need of replacement from the first internal region; and means for removably disposing the replacement core cartridge within the first internal region after removing the core cartridge in need of replacement from the first internal region; wherein the mattress further comprises a topper unit removably coupled to the core unit, the topper unit comprising a second cover defining a second internal region and a first topper cartridge removably disposed within the second internal region; and wherein means for retrofitting the mattress further comprises means for replacing the first topper cartridge with a replacement topper cartridge, comprising means for removing the first topper cartridge from the second internal region; and means for removably disposing the replacement topper cartridge within the second internal region after removing the first topper cartridge from the second internal region.

A mattress has been described that includes a core unit comprising a first cover defining a first internal region; and a plurality of core cartridges removably disposed within the first internal region, each of the core cartridges comprising a firmness characteristic; and a topper unit removably coupled to the core unit, the topper unit comprising a second cover defining a second internal region; and a first topper cartridge removably disposed within the second internal region. In an exemplary embodiment, each of the core cartridges comprises a plurality of springs; a sleeve in which the springs are wrapped, the sleeve defining first, second and third sides; and a label coupled to the first, second and third sides, the label comprising at least one of a color code and a symbol, the at least one of the color code and the symbol indicating the firmness characteristic of the core cartridge. In an exemplary embodiment, the core unit further comprises a first encasement disposed in the first internal region, the encasement defining a third internal region, wherein the core cartridges are removably disposed within the third internal region; and first and second cushion panels, wherein the core cartridges are disposed between the first and second cushion panels; and wherein the topper unit further comprises a second encasement disposed within the second internal region, the encasement defining a fourth internal region, wherein the first topper cartridge is removably disposed within the fourth internal region. In an exemplary embodiment, the topper unit further comprises a second topper cartridge removably coupled to the first topper cartridge and removably disposed within the second internal region; wherein the respective firmness characteristics of the core cartridges are based on a plurality of customer-specific parameters, the plurality of customer-specific parameters comprising a first group of parameters specific to a first person; and a second group of parameters specific to a second person; wherein the plurality of core cartridges comprises a first group of core cartridges comprising firmness characteristics based on the first group of parameters; and a second group of core cartridges comprising firmness characteristics based on the second group of parameters; wherein the first group of core cartridges is generally aligned with the first topper cartridge; and wherein the second group of core cartridges is generally aligned with the second topper cartridge.

A mattress has been described that includes a core unit comprising a first cover defining a first internal region; and a first encasement disposed in the first internal region, the encasement defining a second internal region; a plurality of core cartridges removably disposed within the second internal region, each of the core cartridges comprising a firmness characteristic, each of the core cartridges comprising a plurality of springs; a sleeve in which the springs are wrapped, the sleeve defining first, second and third sides; and a label coupled to the first, second and third sides, the label comprising at least one of a color code and a symbol, the at least one of the color code and the symbol indicating the firmness characteristic of the core cartridge; and first and second cushion panels, wherein the core cartridges are disposed between the first and second cushion panels; and a topper unit removably coupled to the core unit, the topper unit comprising a second cover defining a third internal region; a second encasement disposed within the third internal region, the encasement defining a fourth internal region; a first topper cartridge removably disposed within the fourth internal region; and a second topper cartridge removably coupled to the first topper cartridge and removably disposed within the fourth internal region; wherein the respective firmness characteristics of the core cartridges are based on a plurality of customer-specific parameters, the plurality of customer-specific parameters comprising a first group of parameters specific to a first person; and a second group of parameters specific to a second person; wherein the plurality of core cartridges comprises a first group of core cartridges comprising firmness characteristics based on the first group of parameters; and a second group of core cartridges comprising firmness characteristics based on the second group of parameters; wherein the first group of core cartridges is generally aligned with the first topper cartridge; and wherein the second group of core cartridges is generally aligned with the second topper cartridge.

It is understood that variations may be made in the foregoing without departing from the scope of the disclosure. Furthermore, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A mattress, comprising:
   first and second sides spaced in a parallel relation;
   third and fourth sides spaced in a parallel relation and perpendicular to each of the first and second sides; and
   a plurality of core cartridges, comprising:
      a first group of core cartridges having respective firmness characteristics based on a first group of parameters, the first group of core cartridges being disposed between the first and second sides and between the third and fourth sides; and
      a second group of core cartridges having respective firmness characteristics based on a second group of parameters, the second group of core cartridges being disposed between the first and second sides and between the third and fourth sides so that:
         the second group of core cartridges is disposed between the first group of core cartridges and the fourth side, and
         the first group of core cartridges is disposed between the second group of core cartridges and the third side;
      wherein the second group of parameters is different than the first group of parameters and thus the combination of the respective firmness characteristics of the second group of core cartridges is different than the combination of the respective firmness characteristics of the first group of core cartridges.

2. The mattress of claim 1, further comprising:
   first and second topper cartridges;
   wherein the first group of core cartridges is generally aligned with the first topper cartridge; and
   wherein the second group of core cartridges is generally aligned with the second topper cartridge.

3. The mattress of claim 2, further comprising:
   a first cover, wherein the first cover defines a first internal region in which the first and second groups of core cartridges are disposed; and
   a second cover coupled to the first cover, wherein the second cover defines a second internal region in which the first and second topper cartridges are disposed.

4. The mattress of claim 3, further comprising:
   a first encasement disposed in the first internal region, the first encasement defining a third internal region, wherein the first and second groups of core cartridges are removably disposed within the third internal region; and
   a second encasement disposed in the second internal region, the second encasement defining a fourth internal region, wherein the first and second topper cartridges are removably disposed in the fourth internal region.

5. The mattress of claim 1, wherein each of the core cartridges comprises:
   a plurality of springs;
   a sleeve in which the springs are wrapped; and
   a label coupled to the sleeve, the label comprising:
      at least one of a color code and a symbol, the at least one of the color code and the symbol indicating the firmness characteristic of the core cartridge.

* * * * *